United States Patent
Sarkis et al.

(10) Patent No.: US 11,800,472 B2
(45) Date of Patent: Oct. 24, 2023

(54) DEMODULATION REFERENCE SIGNAL SEQUENCE FOR SIDELINK COMMUNICATION

(71) Applicant: QUALCOMM Incorporated, San Diego, CA (US)

(72) Inventors: Gabi Sarkis, San Diego, CA (US); Shuanshuan Wu, San Diego, CA (US); Kapil Gulati, Belle Mead, NJ (US); Sudhir Kumar Baghel, Hillsborough, NJ (US)

(*) Notice: Subject to any disclaimer, the term of this patent is extended or adjusted under 35 U.S.C. 154(b) by 52 days.

(21) Appl. No.: 17/174,088

(22) Filed: Feb. 11, 2021

(65) Prior Publication Data

US 2021/0258905 A1 Aug. 19, 2021

Related U.S. Application Data

(60) Provisional application No. 62/977,071, filed on Feb. 14, 2020.

(51) Int. Cl.
*H04W 56/00* (2009.01)
*H04W 76/11* (2018.01)
(Continued)

(52) U.S. Cl.
CPC ....... *H04W 56/0015* (2013.01); *H04L 5/0048* (2013.01); *H04L 27/2675* (2013.01);
(Continued)

(58) Field of Classification Search
CPC . H04W 56/0015; H04W 4/40; H04W 72/005; H04W 72/0406; H04W 76/11;
(Continued)

(56) References Cited

U.S. PATENT DOCUMENTS

2016/0135240 A1* 5/2016 Yoon ............... H04W 8/005 370/329
2022/0317229 A1* 10/2022 Baek ............... G01S 5/009

OTHER PUBLICATIONS

Intel Corporation: "Clarification on CRC Value for Initialization of PSSCH Sidelink Scrambling and DMRS Sequence Generation (Correction to V2V CR—36.212)", 3GPP TSG RAN WG1 Meeting #86bis, 3GPP Draft, R1-1609455, 3rd Generation Partnership Project (3GPP), Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, Oct. 1, 2016, pp. 1-2, XP051159526, Retrieved from the Internet: URL: http://www.3gpp.org/ftp/tsg_ran/WG1_RL1/TSGR1_86b/Docs/ [retrieved on Oct. 1, 2016], p. 1, Paragraph 2.

Intel Corporation: "PSSCH DMRS Generation for Sidelink V2V Communication", 3GPP Draft, 3GPP TSG RAN WG1 Meeting #87, R1-1611919 Intel—V2V DMRS, 3rd Generation Partnership Project (3GPP), Mobile Competence Centre, 650, Route Des Lucioles, F-06921 Sophia-Antipolis Cedex, France vol. RAN WG1, No. Reno, USA, Nov. 14, 2016-Nov. 18, 2016, Nov. 13, 2016 (Nov. 13, 2016), XP051175885, pp. 1-3, Retrieved from the Internet: URL: http://www.3gpp.org/ftp/Meetings_3GPP_SYNC/RAN1/Docs/, [retrieved on Nov. 13, 2016], The whole document, p. 2, Paragraph 4.1.

(Continued)

*Primary Examiner* — Eric Myers
(74) *Attorney, Agent, or Firm* — Arun Swain

(57) ABSTRACT

Aspects relate to a demodulation reference signal (DMRS) in a sidelink wireless communication network. In some examples, a sidelink device generates a DMRS based on first and second identifiers of the sidelink device. In some examples, a sidelink device generates a DMRS based on an initialization parameter and/or at least one scaling parameter. In some examples, the initialization parameter may be based on a first identifier of a sidelink device. In some examples, the at least one scaling parameter may be based on a second identifier of a sidelink device. In some examples, a first sidelink device synchronizes with a second sidelink device based on broadcast channel information that is obtained by using DMRS information to decode a received broadcast signal. In some examples, the DMRS information may be based on first and second identifiers of the first sidelink device.

30 Claims, 19 Drawing Sheets

(51) Int. Cl.
*H04W 4/40* (2018.01)
*H04L 27/26* (2006.01)
*H04L 5/00* (2006.01)
*H04W 72/20* (2023.01)
*H04W 72/30* (2023.01)

(52) U.S. Cl.
CPC ............. *H04W 4/40* (2018.02); *H04W 72/20* (2023.01); *H04W 72/30* (2023.01); *H04W 76/11* (2018.02)

(58) Field of Classification Search
CPC ....... H04W 4/46; H04W 76/14; H04W 88/04; H04L 5/0048; H04L 27/2675; H04L 5/001; H04L 27/0006; H04L 27/2613; H04L 5/1469; H04L 5/0051; H04L 5/0094; H04L 5/0005
See application file for complete search history.

(56) References Cited

OTHER PUBLICATIONS

International Search Report and Written Opinion—PCT/US2021/017848—ISA/EPO—dated May 11, 2021.
LG Electronics., et al., WF on Remaining Details of PD2DSCH Design, 3GPP TSG RAN WG1 #79, 3GPP Draft, R1-145381 WF on Remaining Details of PD2DSCH Physical Format, 3rd Generation Partnership Project (3GPP), Mobile Competence Centre, 650, Route Des Lucioles, F-06921 Sophia-Antipolis Cedex, vol. RAN WG1, No. San Francisco, USA, Nov. 17, 2014-Nov. 21, 2014, Nov. 21, 2014 (Nov. 21, 2014), 2 Pages, XP050900453, Retrieved from the Internet: URL: https://www.3gpp.org/ftp/tsg_ran/WG1_RL1/TSGR1_79/Docs/R1-145381.zip, [retrieved on Nov. 21, 2014], p. 2.

* cited by examiner

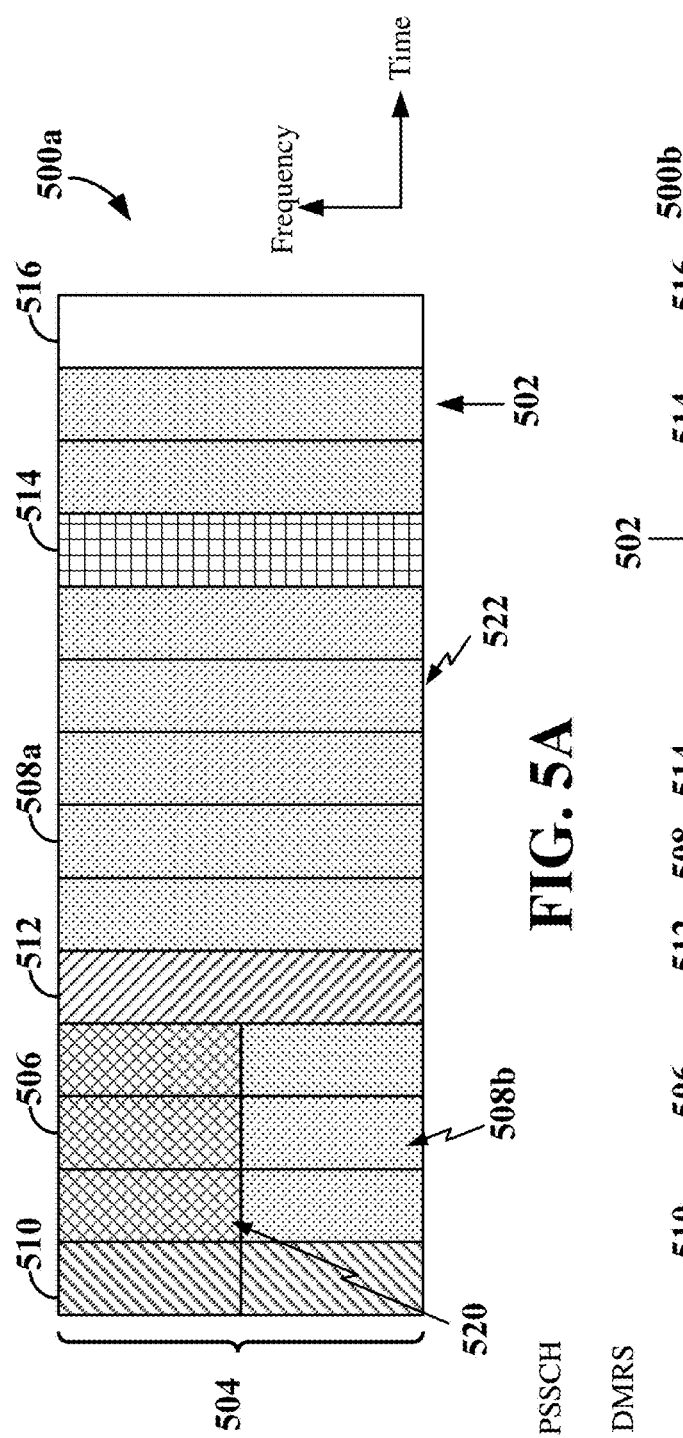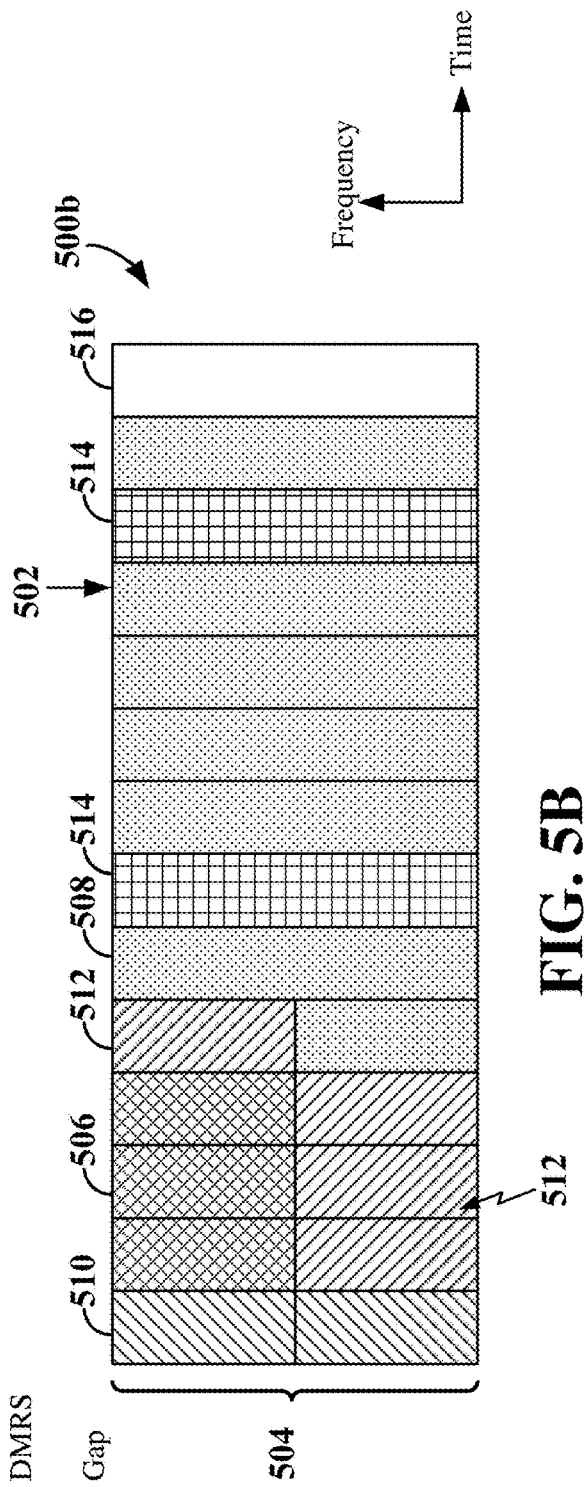
FIG. 5A
FIG. 5B

DEMODULATION REFERENCE SIGNAL SEQUENCE FOR SIDELINK COMMUNICATION

CROSS-REFERENCE TO RELATED APPLICATION(S)

The present application for patent claims priority to and the benefit of U.S. Provisional Application No. 62/977,071, titled "DEMODULATION REFERENCE SIGNAL SEQUENCE FOR SIDELINK COMMUNICATION" filed Feb. 14, 2020, and assigned to the assignee hereof and hereby expressly incorporated by reference herein as if fully set forth below in its entirety and for all applicable purposes.

TECHNICAL FIELD

The technology discussed below relates generally to wireless communication networks and more particularly to generating and using a demodulation reference signal (DMRS) sequence for sidelink communication.

INTRODUCTION

In many existing wireless communication systems, a cellular network is implemented by enabling wireless user equipment to communicate with one another through signaling with a nearby base station or cell. As a user equipment moves across a service area, handovers take place such that each user equipment maintains communication with one another via its respective cell.

Another scheme for a wireless communication system is a mesh or peer to peer (P2P) network, in which wireless user equipment may signal one another directly, rather than via an intermediary base station or cell. Somewhat in between these schemes is a system configured for sidelink signaling. With sidelink signaling, a wireless user equipment communicates in a cellular system, generally under the control of a base station. However, the wireless user equipment is further configured for sidelink signaling directly between user equipment without transmissions passing through the base station.

One example of a sidelink wireless communication system is a vehicle-to-everything (V2X) communication system. V2X communication involves the exchange of information not only between vehicles themselves, but also between vehicles and external systems, such as streetlights, buildings, pedestrians, and wireless communication networks. V2X systems enable vehicles to obtain information related to the weather, nearby accidents, road conditions, activities of nearby vehicles and pedestrians, objects nearby the vehicle, and other pertinent information that may be utilized to improve the vehicle driving experience, increase vehicle safety, and support autonomous vehicles.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, the disclosure provides a first sidelink device that includes a transceiver, a memory, and a processor communicatively coupled to the transceiver and the memory. The processor and the memory may be configured to determine at least one of an initialization parameter based at least on a first sidelink identifier for the first sidelink device, at least one scaling parameter based at least on a second sidelink identifier for the first sidelink device, or a combination thereof. The processor and the memory also may be configured to generate a demodulation reference signal (DMRS) using at least one of the initialization parameter, the at least one scaling parameter, or a combination thereof. The processor and the memory may further be configured to transmit the DMRS to a second sidelink device.

In some examples, the disclosure provides a method for wireless communication at a first sidelink device. The method may include determining at least one of an initialization parameter based at least on a first sidelink identifier for the first sidelink device, at least one scaling parameter based at least on a second sidelink identifier for the first sidelink device, or a combination thereof. The method also may include generating a demodulation reference signal (DMRS) using at least one of the initialization parameter, the at least one scaling parameter, or a combination thereof. The method may further include transmitting the DMRS to a second sidelink device.

In some examples, the disclosure provides a first sidelink device. The first sidelink device may include means for determining at least one of an initialization parameter based at least on a first sidelink identifier for the first sidelink device, at least one scaling parameter based at least on a second sidelink identifier for the first sidelink device, or a combination thereof. The first sidelink device also may include means for generating a demodulation reference signal (DMRS) using at least one of the initialization parameter, the at least one scaling parameter, or a combination thereof. The first sidelink device may further include means for transmitting the DMRS to a second sidelink device.

In some examples, the disclosure provides an article of manufacture for use by a first sidelink device. The article of manufacture may include a computer-readable medium having stored therein instructions executable by one or more processors of the first sidelink device to determine at least one of an initialization parameter based at least on a first sidelink identifier for the first sidelink device, at least one scaling parameter based at least on a second sidelink identifier for the first sidelink device, or a combination thereof. The computer-readable medium may also have stored therein instructions executable by the one or more processors of the first sidelink device to generate a demodulation reference signal (DMRS) using at least one of the initialization parameter, the at least one scaling parameter, or a combination thereof. The computer-readable medium may further have stored therein instructions executable by the one or more processors of the first sidelink device to transmit the DMRS to a second sidelink device.

In some examples, the disclosure provides a first sidelink device that includes a transceiver, a memory, and a processor communicatively coupled to the transceiver and the memory. The processor and the memory may be configured to receive a broadcast signal from a second sidelink device and determine at least one of an initialization parameter based at least on a first sidelink identifier for the second sidelink device, at least one scaling parameter based at least on a second sidelink identifier for the second sidelink device, or a combination thereof. The processor and the memory also may be configured to determine demodulation reference signal (DMRS) information using at least one of the initialization parameter, the at least one scaling parameter, or a combination thereof. The processor and the memory may further be configured to decode the broadcast signal using the DMRS information to obtain broadcast channel information and synchronize with the second sidelink device using the broadcast channel information.

In some examples, the disclosure provides a method for wireless communication at a first sidelink device. The method may include receiving a broadcast signal from a second sidelink device and determining at least one of an initialization parameter based at least on a first sidelink identifier for the second sidelink device, at least one scaling parameter based at least on a second sidelink identifier for the second sidelink device, or a combination thereof. The method may also include determining demodulation reference signal (DMRS) information using at least one of the initialization parameter, the at least one scaling parameter, or a combination thereof. The method may further include decoding the broadcast signal using the DMRS information to obtain broadcast channel information and synchronizing with the second sidelink device using the broadcast channel information.

In some examples, the disclosure provides a first sidelink device. The first sidelink device may include means for receiving a broadcast signal from a second sidelink device and means for determining at least one of an initialization parameter based at least on a first sidelink identifier for the second sidelink device, at least one scaling parameter based at least on a second sidelink identifier for the second sidelink device, or a combination thereof. The first sidelink device also may include means for determining demodulation reference signal (DMRS) information using at least one of the initialization parameter, the at least one scaling parameter, or a combination thereof. The first sidelink device may further include means for decoding the broadcast signal using the DMRS information to obtain broadcast channel information and means for synchronizing with the second sidelink device using the broadcast channel information.

In some examples, the disclosure provides an article of manufacture for use by a first sidelink device. The article of manufacture may include a computer-readable medium having stored therein instructions executable by one or more processors of the first sidelink device to receive a broadcast signal from a second sidelink device and determine at least one of an initialization parameter based at least on a first sidelink identifier for the second sidelink device, at least one scaling parameter based at least on a second sidelink identifier for the second sidelink device, or a combination thereof. The computer-readable medium may also have stored therein instructions executable by the one or more processors of the first sidelink device to determine demodulation reference signal (DMRS) information using at least one of the initialization parameter, the at least one scaling parameter, or a combination thereof. The computer-readable medium may further have stored therein instructions executable by the one or more processors of the first sidelink device to decode the broadcast signal using the DMRS information to obtain broadcast channel information and synchronize with the second sidelink device using the broadcast channel information.

These and other aspects of the disclosure will become more fully understood upon a review of the detailed description, which follows. Other aspects, features, and examples of the present disclosure will become apparent to those of ordinary skill in the art, upon reviewing the following description of specific examples of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while examples may be discussed below as device, system, or method examples it should be understood that such examples can be implemented in various devices, systems, and methods.

BRIEF DESCRIPTION OF THE DRAWINGS

FIGS. 5A and 5B illustrate examples of sidelink slot structures according to some aspects.

DETAILED DESCRIPTION

Figure 1:
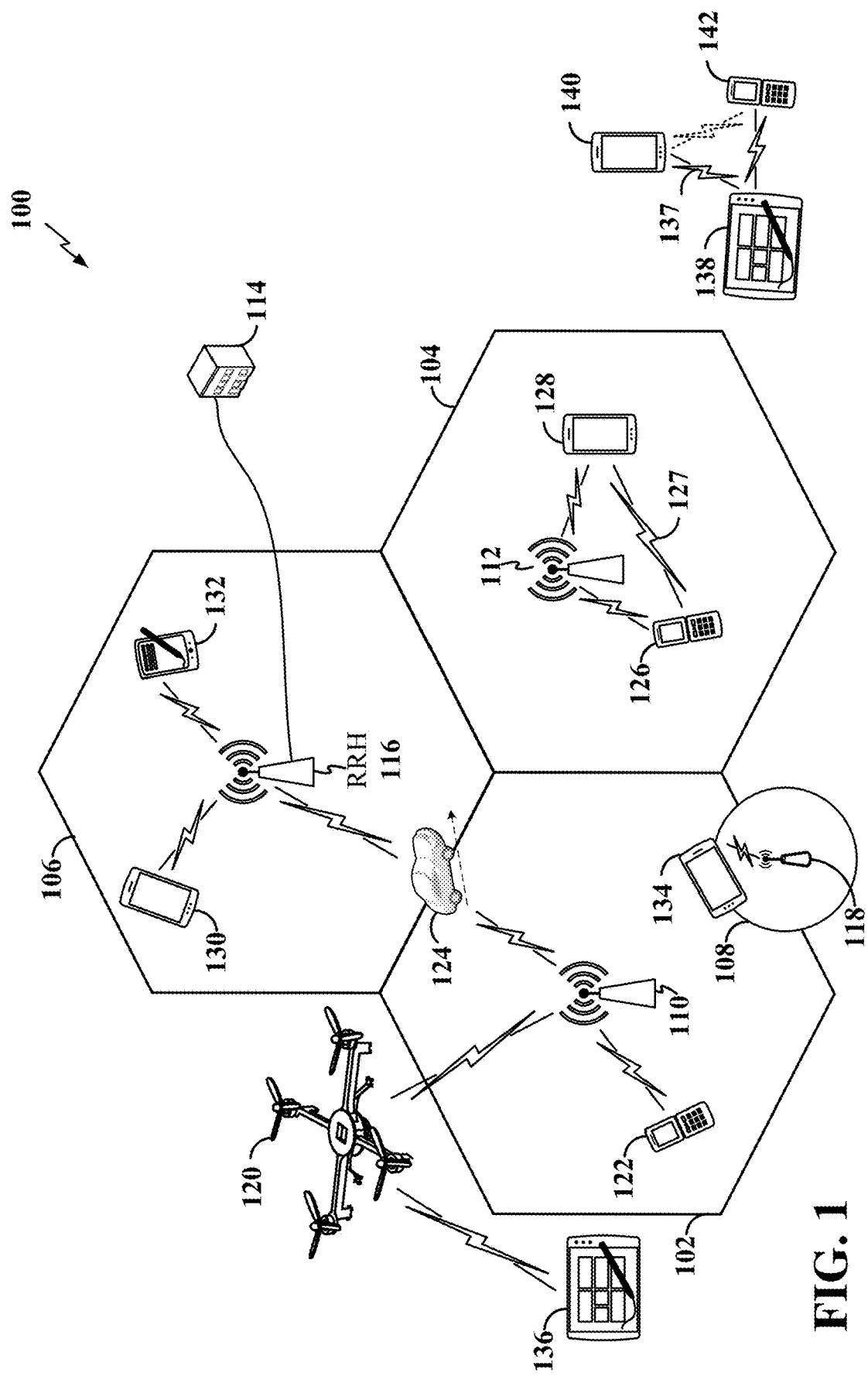
FIG. 1 is a conceptual illustration of an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Additionally, well-known elements will not be described in detail or will be omitted so as not to obscure the relevant details of the disclosure.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Various aspects of the disclosure relate to sidelink wireless communication. In some examples, a first sidelink device generates a demodulation reference signal (DMRS) based on first and second identifiers of the first sidelink device and sends the DMRS to a second sidelink device. In some examples, the second sidelink device determines the first and second identifiers of the first sidelink device and generates DMRS information based on these identifiers. The second sidelink device uses the DMRS information to decode a broadcast signal from the first sidelink device and synchronize with the first sidelink device based on the decoded broadcast signal.

The various concepts presented throughout this disclosure may be implemented across a broad variety of telecommunication systems, network architectures, and communication standards. Referring now to FIG. 1, as an illustrative example without limitation, a schematic illustration of a radio access network (RAN) 100 is provided. The RAN 100 may implement any suitable wireless communication technology or technologies to provide radio access. As one example, the RAN 100 may operate according to 3$^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station 120. That is, in some examples, a cell may not necessarily be stationary, and the geographic area of the cell may move according to the location of a mobile base station such as the quadcopter or drone 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with a mobile base station (e.g., the quadcopter or drone 120). Here, each base station 110, 112, 114, 118, and 120 may be configured to provide an access point to a core network (not shown) for all the UEs in the respective cells. In another example, a mobile network node (e.g., the quadcopter or drone 120) may be configured to function as a UE. For example, the quadcopter or drone 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 millisecond (ms). Multiple subframes or slots may be grouped together to form a single frame or radio frame. Of course, these definitions are not required, and any suitable scheme for organizing waveforms may be utilized, and various time divisions of the waveform may have any suitable duration.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier 1-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (1-DMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality. The RAN 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and radio frame timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the RAN 100. Each of the cells may measure a strength of the pilot signal, and the RAN (e.g., one or more of the base stations 110 and 114/116 and/or a central node within the core network) may determine a serving cell for the UE 124. As the UE 124 moves through the RAN 100, the network may continue to monitor the uplink pilot signal transmitted by the UE 124. When the signal strength or quality of the pilot signal measured by a neighboring cell exceeds that of the signal strength or quality measured by the serving cell, the RAN 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks can enable uplink-based mobility framework and improve efficiency of both the UE and the network.

Efficiencies may be brought about because the number of mobility messages that need to be exchanged between the UE and the network may be reduced.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using peer to peer (P2P) or sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a P2P network, a device-to-device (D2D) network, vehicle-to-vehicle (V2V) network, a vehicle-to-everything (V2X), a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on Institute of Electrical and Electronics Engineers (IEEE) 802.11p standards and cellular V2X based on LTE and/or 5G (New Radio) standards. Various aspects of the present disclosure may relate to New Radio (NR) cellular V2X networks, referred to herein as V2X networks, for convenience. However, it should be understood that the concepts disclosed herein may not be limited to a particular V2X standard or may be directed to sidelink networks other than V2X networks.

Figure 2:
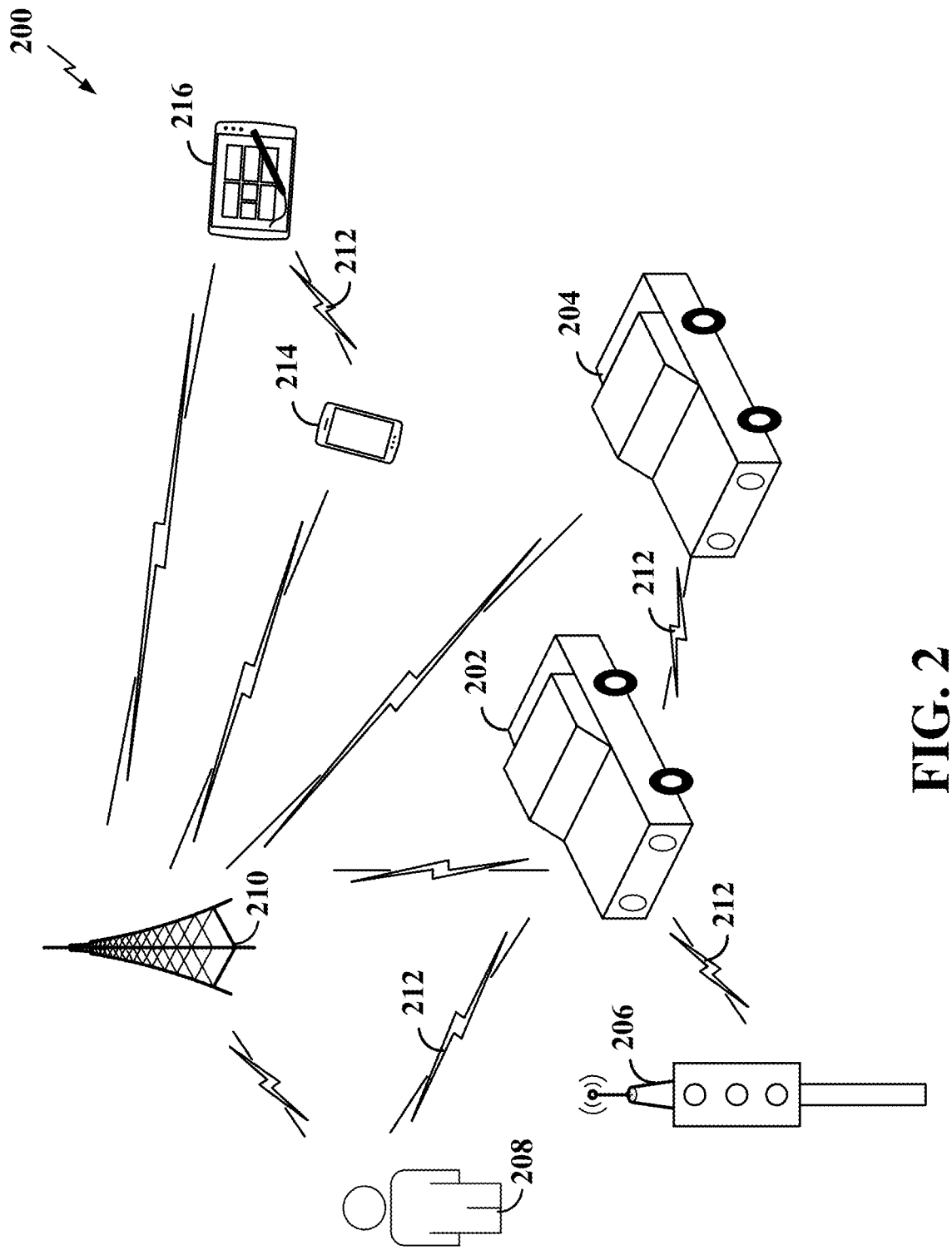
FIG. 2 is a conceptual illustration of an example of a wireless communication network configured to support D2D or sidelink communication according to some aspects.

FIG. 2 illustrates an example of a wireless communication network 200 configured to support D2D or sidelink communication. In some examples, sidelink communication may include V2X communication. V2X communication involves the wireless exchange of information directly between not only vehicles (e.g., UEs in vehicles 202 and 204) themselves, but also directly between vehicles 202/204 and infrastructure (e.g., roadside units (RSUs) 206), such as streetlights, buildings, traffic cameras, tollbooths or other stationary objects, vehicles 202/204 and pedestrians/cyclists 208, and vehicles 202/204 and wireless communication networks (e.g., base station 210). In some examples, V2X communication may be implemented in accordance with the New Radio (NR) cellular V2X standard defined by 3GPP, Release 16, or other suitable standard.

V2X communication enables vehicles 202 and 204 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 202 and 204 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 208 may be utilized to trigger a warning sound, vibration, flashing light, etc., in case of imminent danger.

The sidelink communication between vehicle-UEs (V-UEs) 202 and 204 or between a V-UE 202 or 204 and either an RSU 206 or a pedestrian-UE (P-UE) 208 may occur over a sidelink 212 utilizing a proximity service (ProSe) PC5 interface. In various aspects of the disclosure, the PC5 interface may further be utilized to support D2D sidelink 212 communication in other proximity use cases. Examples of other proximity use cases may include public safety or commercial (e.g., entertainment, education, office, medical, and/or interactive) based proximity services. In the example shown in FIG. 2, ProSe communication may further occur between UEs 214 and 216. The V-UEs 202 and 204, the P-UE 208, and the UEs 214 and 216 may correspond to any of the UEs or scheduled entities shown in any of FIGS. 1, 3, 7, 12, and 15.

ProSe communication may support different operational scenarios, such as in-coverage, out-of-coverage, and partial coverage. Out-of-coverage refers to a scenario in which UEs (e.g., V-UEs 202 and 204 and P-UE 208) are outside of the coverage area of a base station (e.g., base station 210), but each are still configured for ProSe communication. Partial coverage refers to a scenario in which some of the UEs (e.g., V-UE 204) are outside of the coverage area of the base station 210, while other UEs (e.g., V-UE 202 and P-UE 208) are in communication with the base station 210. In-coverage refers to a scenario in which UEs (e.g., UEs 214 and 216) are in communication with the base station 210 (e.g., gNB) via a Uu (e.g., cellular interface) connection to receive ProSe service authorization and provisioning information to support ProSe operations.

To facilitate D2D sidelink communication between, for example, UEs 214 and 216 over the sidelink 212, the UEs 214 and 216 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 212. For example, the discovery signal may be utilized by the UE 216 to measure the signal strength and channel status of a potential sidelink (e.g., sidelink 212) with another UE (e.g., UE 214). The UE 216 may utilize the measurement results to select a UE (e.g., UE 214) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., base station 210).

In addition, there may be two main resource allocation modes of operation for sidelink (e.g., PC5) communications. In a first mode, Mode 1, a base station (e.g., gNB) 210 may allocate resources to sidelink devices (e.g., V2X devices or other sidelink devices) for sidelink communication between the sidelink devices in various manners. For example, the base station 210 may allocate sidelink resources dynamically (e.g., a dynamic grant) to sidelink devices, in response to requests for sidelink resources from the sidelink devices. The base station 210 may further activate preconfigured sidelink grants (e.g., configured grants) for sidelink communication among the sidelink devices. In Mode 1, sidelink feedback may be reported back to the base station 210 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink 212 is the same between the two modes. Therefore, from a receiver's point of view, there is no difference between the modes.

Figure 3:
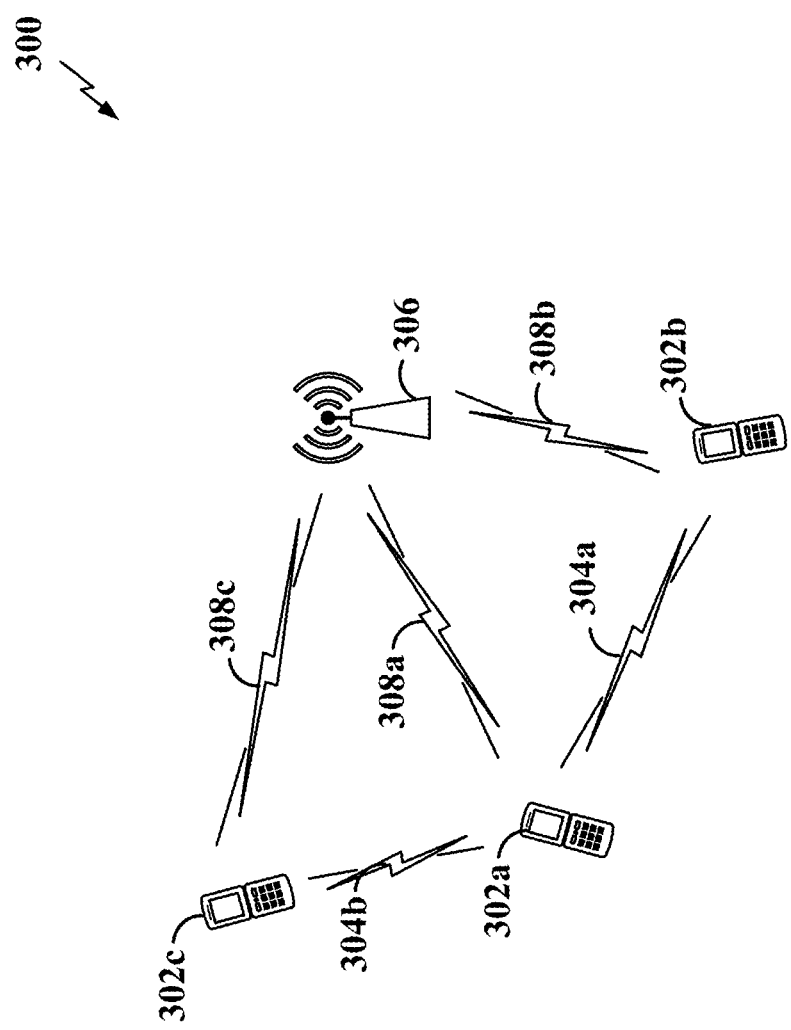
FIG. 3 is a diagram illustrating an example of a wireless communication network for facilitating both cellular and sidelink communication according to some aspects.

FIG. 3 is a diagram illustrating an example of a wireless communication network 300 for facilitating both cellular and sidelink communication. The wireless communication network 300 may correspond, for example, to the RAN 100 illustrated in FIG. 1. The wireless communication network 300 includes a plurality of wireless communication devices 302a, 302b, and 302c and a base station (e.g., eNB or gNB) 306. In some examples, the wireless communication devices 302a, 302b, and 302c may be UEs capable of implementing sidelink communication (e.g., V2X or D2D). The wireless communication devices 302a, 302b, and 302c may correspond to any of the UEs or scheduled entities shown in any of FIGS. 1, 2, 7, 12, and 15. The base station 306 may correspond to any of the base stations or scheduling entities shown in any of FIGS. 1, 2, and 7.

The wireless communication devices 302a and 302b may communicate over a first sidelink 304a, while wireless communication devices 302a and 302c may communicate over a second sidelink 304b. Each of the sidelinks 304a and 304b may utilize, for example, a PC5 interface. Wireless communication devices 302a, 302b, and 302c may further communicate with the base station 306 over respective Uu links 308a, 308b, and 308b. The sidelink communication over the sidelinks 304a and 304b may be carried, for example, in a licensed frequency domain using radio resources operating according to a 5G NR or NR sidelink (SL) specification and/or in an unlicensed frequency domain, using radio resources operating according to 5G new radio-unlicensed (NR-U) specifications.

In some examples, a common carrier may be shared between the sidelinks 304a and 304b and Uu links 308a-308c, such that resources on the common carrier may be allocated for both sidelink communication between wireless communication devices 302a-302c and cellular communication (e.g., uplink and downlink communication) between the wireless communication devices 302a-302c and the base station 306. For example, the wireless communication network 300 may be configured to support a Mode 1 sidelink network in which resources for both sidelink and cellular communication are scheduled by the base station 306. In other examples in which Mode 2 sidelink is implemented on the sidelinks 304a and 304b, the wireless communication devices 302a-302c may autonomously select sidelink resources (e.g., from one or more frequency bands or sub-bands designated for sidelink communication) for communication therebetween. In this example, the wireless communication devices 302a-302c may function as both scheduling entities and scheduled entities scheduling sidelink resources for communication with each other.

Various aspects of the present disclosure will be described with reference to an OFDM waveform, schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-1-DMA waveforms.

Figure 4:
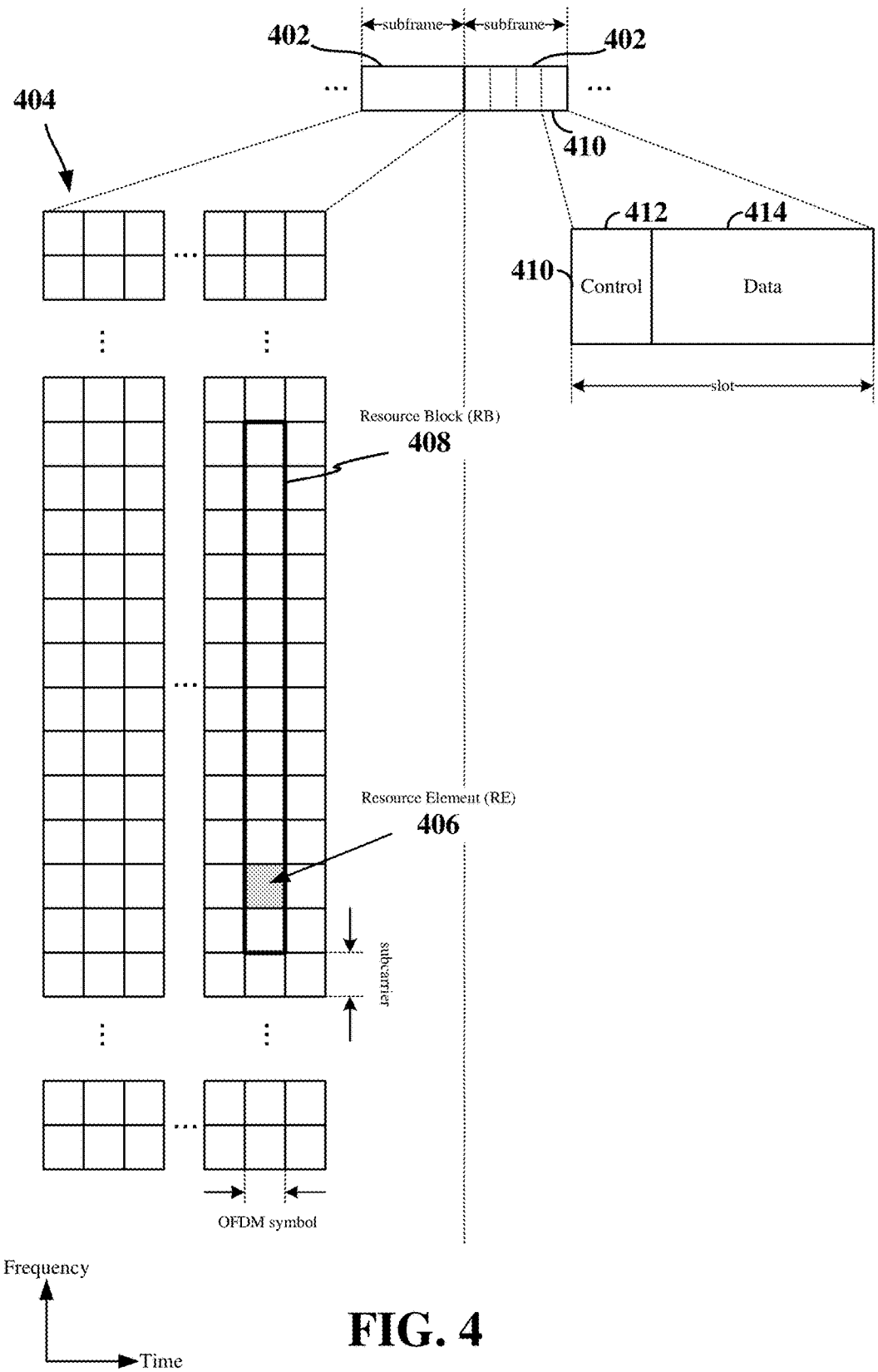
FIG. 4 is a schematic diagram illustrating organization of wireless resources in an air interface utilizing orthogonal frequency divisional multiplexing (OFDM) according to some aspects.

Referring now to FIG. 4, an expanded view of an example subframe 402 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely an example, and different slot structures may be utilized, and may include one or more of each of the control region(s) and data region(s).

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 140 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a PC5 interface, the control region 412 of the slot 410 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., an Rx V2X device or some other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 4 are not necessarily all of the channels or carriers that may be utilized between devices, and those of ordinary skill in the art will recognize that other channels or carriers may be utilized in addition to those illustrated, such as other traffic, control, and feedback channels.

As indicated above, a wireless communication device (e.g., V2X or other D2D device) may schedule sidelink communication (e.g., PC5) by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the size of SCI-2 by indicating an amount of time-frequency resources that are allotted for SCI-2, a number of a PSSCH DMRS port(s), and a modulation and coding scheme (MCS) index. SCI-1 may include other information that is useful for establishing and decoding a PSSCH resource.

SCI-2 may also be transmitted on the PSCCH and may contain information for decoding the PSSCH. According to some aspects, SCI-2 includes a 16-bit layer 1 (L1) destination identifier (ID), an 8-bit L1 source ID, a HARQ process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource. In various aspects of the disclosure, the SCI-2 may further include the SL PT-RS configuration indicating a configurable number of PT-RS ports and a PTRS-DMRS port association.

FIGS. 5A and 5B illustrate examples of sidelink slot structures according to some aspects. The sidelink slot structures may be utilized, for example, in a V2X or other D2D network implementing sidelink. In the examples shown in FIGS. 5A and 5B, time is in the horizontal direction with units of symbols 502 (e.g., OFDM symbols); and frequency is in the vertical direction. Here, a carrier bandwidth 504 allocated for sidelink communication is illustrated along the frequency axis. The carrier bandwidth 504 may include a plurality sub-channels, where each sub-channel may include a configurable number of PRBs (e.g., 5, 15, 20, 25, 50, 75, or 50 PRBs).

Each of FIGS. 5A and 5B illustrate an example of a slot 500a and 500b including fourteen symbols 502 that may be used for sidelink communication. However, it should be understood that sidelink communication can be configured to occupy fewer than fourteen symbols in a slot 500a and 500b, and the disclosure is not limited to any particular number of symbols 502. Each sidelink slot 500a and 500b includes a physical sidelink control channel (PSCCH) 506 occupying a control region 520 of the slot 500a and 500b and a physical sidelink shared channel (PSSCH) 508 occupying a data region 522 of the slot 500a and 500b. The PSCCH 506 and PSSCH 508 are each transmitted on one or more symbols 502 of the slot 500a. The PSCCH 506 includes, for example, SCI-1 that schedules transmission of data traffic on time-frequency resources of the corresponding PSSCH 508. As shown in FIGS. 5A and 5B, the PSCCH 506 and corresponding PSSCH 508 are transmitted in the same slot 500a and 500b.

In some examples, the PSCCH 506 duration is configured to be two or three symbols. In addition, the PSCCH 506 may be configured to span a configurable number of PRBs, limited to a single sub-channel. For example, the PSCCH 506 may span 5, 12, 15, 20, or 25 PRBs of a single sub-channel. A DMRS may further be present in every PSCCH symbol. In some examples, the DMRS may be placed on every fourth RE of the PSCCH 506. A frequency domain orthogonal cover code (FD-OCC) may further be applied to the PSCCH DMRS to reduce the impact of colliding PSCCH transmissions on the sidelink channel. For example, a transmitting wireless communication device may randomly select the FD-OCC from a set of pre-defined FD-OCCs. In each of the examples shown in FIGS. 5A and 5N, the starting symbol for the PSCCH 506 is the second symbol of the corresponding slot 500a and 500b and the PSCCH 506 spans three symbols 502.

The PSSCH 508 may be time-division multiplexed (TDMed) with the PSCCH 506 and/or frequency-division multiplexed (FDMed) with the PSCCH 506. In the example shown in FIG. 5A, the PSSCH 508 includes a first portion 508a that is TDMed with the PSCCH 506 and a second portion 508b that is FDMed with the PSCCH 506.

One and two layer transmissions of the PSSCH 508 may be supported with various modulation orders (e.g., quadrature phase shift keying (QPSK), 16-QAM, 64-QAM and 256-QAM). In addition, the PSSCH 508 may include DMRSs 514 configured in a two, three, or four symbol DMRS pattern. For example, slot 500a shown in FIG. 5A illustrates a two symbol DMRS pattern, while slot 500b shown in FIG. 5B illustrates a three symbol DMRS pattern. In some examples, the transmitting wireless communication device can select the DMRS pattern and indicate the selected DMRS pattern in SCI-1, according to channel conditions. The DMRS pattern may be selected, for example, based on the number of PSSCH 508 symbols in the slot 500a and 500b. In addition, a gap symbol 516 is present after the PSSCH 508 in each slot 500a and 500b.

Each slot 500a and 500b further includes SCI-2 512 mapped to contiguous RBs in the PSSCH 508 starting from the first symbol containing a PSSCH DMRS. In the example shown in FIG. 5A, the first symbol containing a PSSCH DMRS is the fifth symbol occurring immediately after the last symbol carrying the PSCCH 506. Therefore, the SCI-2 512 is mapped to RBs within the fifth symbol. In the example shown in FIG. 5B, the first symbol containing a PSSCH DMRS is the second symbol, which also includes the PSCCH 506. In addition, the SCI-2/PSSCH DMRS 512 are shown spanning symbols two through five. As a result, the SCI-2/PSSCH DMRS 512 may be FDMed with the PSCCH 506 in symbols two through four and TDMed with the PSCCH 506 in symbol five.

The SCI-2 may be scrambled separately from the sidelink shared channel. In addition, the SCI-2 may utilize QPSK. When the PSSCH transmission spans two layers, the SCI-2 modulation symbols may be copied on both layers. The SCI-1 in the PSCCH 506 may be blind decoded at the receiving wireless communication device. However, since the format, starting location, and number of REs of the SCI-2 512 may be derived from the SCI-1, blind decoding of SCI-2 is not needed at the receiver (receiving wireless communication device).

In each of FIGS. 5A and 5B, the second symbol of each slot 500a and 500b is copied onto (repeated on) a first symbol 510 thereof for automatic gain control (AGC) settling. For example, in FIG. 5A, the second symbol containing the PSCCH 506 FDMed with the second portion 508b of the PSSCH 508 may be transmitted on both the first symbol and the second symbol. In the example shown in FIG. 5B, the second symbol containing the PSCCH 506 FDMed with the SCI-2/PSSCH DMRS 512 may be transmitted on both the first symbol and the second symbol.

Within a sidelink network, quality of service (QoS) and system performance may be affected by timing misalignments between sidelink devices. Therefore, to maintain a common synchronization of time and frequency among the sidelink devices, each of the sidelink devices may be synchronized either to a synchronization source, such as a gNB, eNB, or global navigation satellite system (GNSS), or based on a time/frequency reference within a sidelink device. One or more sidelink devices may further generate and transmit synchronization information for use by other sidelink devices in synchronizing the radio frame timing (e.g., radio frame boundaries and frame index) to the transmitting sidelink device. For example, the synchronization information may include a sidelink synchronization signal (S-SS). In some examples, the S-SS may be a sidelink synchronization block (S-SSB), which includes a sidelink primary synchronization signal (S-PSS), sidelink secondary synchronization signal (S-SSS), and a physical sidelink broadcast channel (PSBCH). The S-SSB may further include a downlink modulation reference signal (DMRS), or other signals used for synchronization.

Figure 6:
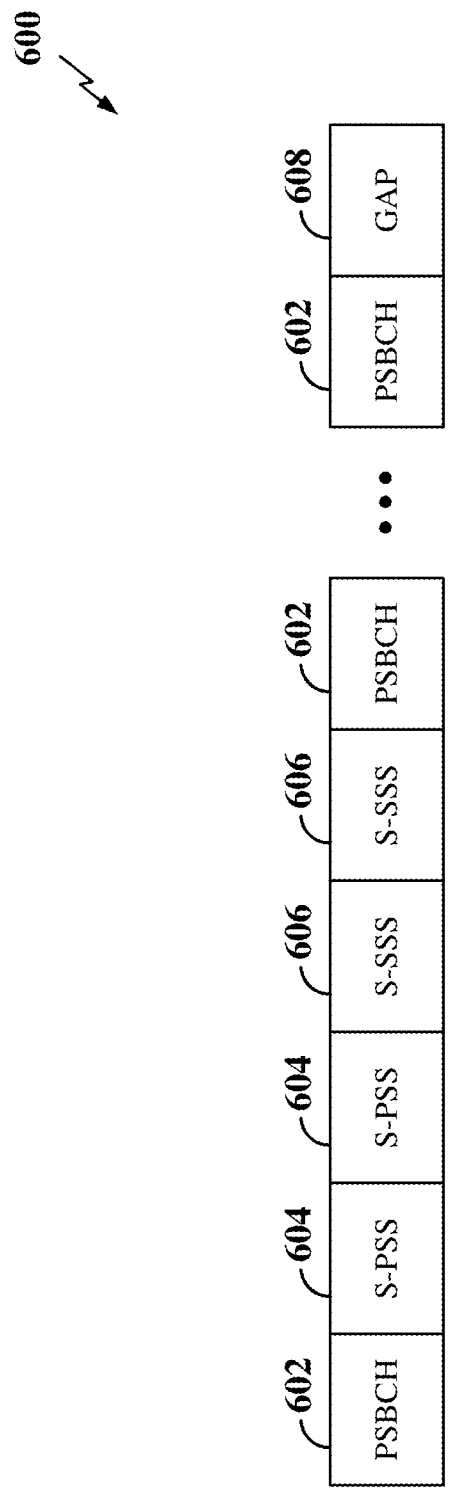
FIG. 6 is a conceptual illustration of a sidelink synchronization signal block according to some aspects.

FIG. 6 illustrates an example of an S-SSB structure 600. The S-SSB structure 600 includes PSBCH symbols 602, S-PSS symbols 604, S-SSS symbols 606, and a gap 608.

Figure 7:
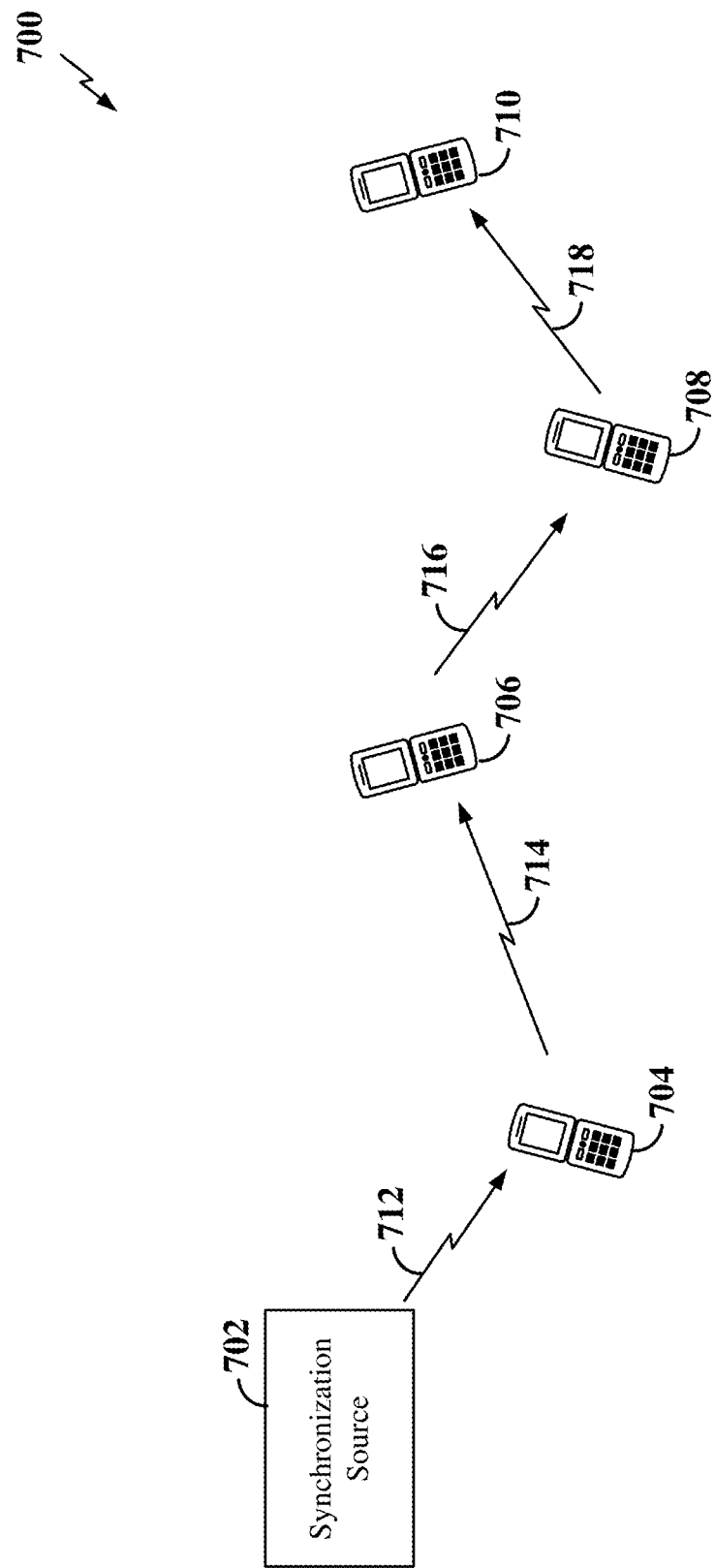
FIG. 7 is a conceptual illustration of an example of synchronization in a sidelink wireless communication network according to some aspects.

FIG. 7 is a diagram illustrating an example of synchronization in a sidelink wireless communication network 700. The sidelink wireless communication network 700 includes a synchronization source 702 and a plurality of sidelink devices (e.g., UEs) 704, 706, 708, and 710. In some examples, the synchronization source 702 may include a base station (e.g., gNB, eNB, GNSS, etc.) or other suitable source of synchronization information. In some examples, the synchronization source 702 may correspond to any of the base stations or scheduling entities or timing sources shown in any of FIGS. 1, 2, and 3. The UEs 704, 706, 708, and 710 may correspond to any of the UEs or scheduled entities shown in any of FIGS. 1, 2, 3, 12, and 15.

The synchronization source 702 may be configured to generate and transmit a synchronization signal 712 that may be received and processed by a first UE (UE-1) 704. For example, in scenarios where the synchronization source 702 is a GNSS satellite, the synchronization signal 712 may include timestamps that provide very reliable timing information. As another example, in scenarios where the synchronization source 702 is a gNB, the synchronization signal 712 may take the form of a synchronization signal block that provides reliable timing signaling.

The first UE 704 may utilize the synchronization information in the synchronization signal 712 to synchronize the radio frame timing (e.g., radio frame boundaries and frame index) for the first UE 704 with the synchronization source 702. The first UE 704 may further be in sidelink wireless communication with a second UE (UE-2) 706. However, the second UE 706 may be out of the coverage area of the synchronization source 702. Therefore, the first UE 704 may generate and transmit a first sidelink synchronization signal (S-SS) 714 based on the synchronization established with the synchronization source 702. The first S-SS 714 may be received by the second UE 706, which may utilize the first S-SS 714 to synchronize the radio frame timing with the first UE 704.

The second UE 706 may, in turn, generate and transmit a second S-SS 716 based on the synchronization established with the first UE 704 to synchronize the timing of a third UE (UE-3) 708 that is out of the coverage area of the synchronization source 702 and the first UE 704. Similarly, the third UE 708 may generate and transmit a third S-SS 718 based on the synchronization established with the second UE 706 to synchronize the timing of a fourth UE (UE-4) 710 that is out of the coverage area of the synchronization source 702 and each of the first and second UEs 704 and 706.

Each of the UEs in FIG. 7 may be assigned a physical-layer synchronization sidelink identifier. In some examples, there are 672 unique physical-layer synchronization sidelink identities as given by Equation 1:

$$N_{ID}^{SL} = N_{ID,1}^{SL} + 336 N_{ID,2}^{SL} \qquad \text{EQUATION 1}$$

Here, $N_{ID,1}^{SL} \in \{0, 1, \ldots, 335\}$ and $N_{ID,2}^{SL} \in \{0,1\}$. The sequences are divided into two sets, id_net consisting of $N_{ID}^{SL} = 0, 1, \ldots 335$ and id_oon consisting of $N_{ID}^{SL} = 336, 337, \ldots, 671$. In some examples, the first set (id_net) may be assigned to sidelink devices within one hop of a synchronization source. In some examples, the second set (id_oon) may be assigned to sidelink devices beyond one hop of a synchronization source.

A sequence $d_{S-PSS}(n)$ for the S-PSS discussed above may be defined by:

$$d_{S-PSS}(n) = 1 - 2x(m)$$

$$m = (n + 22 + 43 N_{ID,2}^{SL}) \bmod 127$$

$$0 \leq n < 127 \qquad \text{EQUATION 2}$$

where $$x(i+7) = (x(i+4) + x(i)) \bmod 2$$

and $$[x(6)\ x(5)\ x(4)\ x(3)\ x(2)\ x(1)\ x(0)] = [1\ 1\ 1\ 0\ 1\ 1\ 0]$$

As discussed below, the S-PSS thus is based in part on a sidelink identifier (e.g., a physical-layer synchronization sidelink identifier) $N_{ID,2}^{SL}$.

A sequence $d_{S-SSS}(n)$ for the S-SSS discussed above may be defined by:

$$d_{S-SSS}(n) = [1 - 2x_0((n + m_0) \bmod 127)] \qquad \text{EQUATION 3}$$

$$[1 - 2x_0((n + m_1) \bmod 127)]$$

$$m_0 = 15 \left\lfloor \frac{N_{ID,1}^{SL}}{112} \right\rfloor + 5 N_{ID,2}^{SL}$$

$$m_1 = N_{ID,1}^{SL} \bmod 112$$

$$0 \leq n < 127$$

where $$x_0(i+7) = (x_0(i+4) + x_0(i)) \bmod 2$$

$$x_1(i+7) = (x_1(i+1) + x_1(0)) \bmod 2$$

and $$[x_0(6)\ x_0(5)\ x_0(4)\ x_0(3)\ x_0(2)\ x_0(1)\ x_0(0)] = [0\ 0\ 0\ 0\ 0\ 0\ 1]$$

$$[x_1(6)\ x_1(5)\ x_1(4)\ x_1(3)\ x_1(2)\ x_1(1)\ x_1(0)] = [0\ 0\ 0\ 0\ 0\ 0\ 1]$$

As discussed below, the S-SSS is thus based in part on a sidelink identifier $N_{ID,1}^{SL}$ and a sidelink identifier $N_{ID,2}^{SL}$.

In a sidelink network, two synchronization (sync) resources are configured within a synchronization period. The resources may be designated as a first synchronization resource R-1 and a second synchronization resource R-2.

Table 1 illustrates an example of how synchronization resources may be allocated to sidelink devices (e.g., in the example of FIG. 7) in a scenario where a GNSS satellite is the synchronization source (e.g., the synchronization source 702). In this example, a first UE (designated UE-1) receives a synchronization signal from the GNSS satellite. A second UE (designated UE-2) receives a synchronization signal (e.g., an S-SSB) from the first UE (UE-1). A third UE (designated UE-3) receives a synchronization signal (e.g., an S-SSB) from the second UE (UE-2). A fourth UE (designated UE-4) receives a synchronization signal (e.g., an S-SSB) from the third UE (UE-3). A fifth UE (designated UE-5) receives a synchronization signal (e.g., an S-SSB) from the fourth UE (UE-4). Table 1 indicates which UEs are in within the coverage (in-coverage) of the synchronization source. In this example, only the first UE (UE-1) is in-coverage.

TABLE 1

| Priority | Sync Tx | Resource | In-coverage | SLSS ID |
|---|---|---|---|---|
| P0 | GNSS | — | — | — |
| P1 | UE-1 | R-1 | True | 0 |
| P2 | UE-2 | R-2 | False | 0 |
| P2_2 | UE-3 | R-1 | False | 336 |
| P2_3 | UE-4 | R-2 | False | 336 |
| P2_4 | UE-5 | R-1 | False | 336 |
| ... | ... | | | |

The first UE (UE-1) transmits its synchronization signal via the first synchronization resource R-1. This transmission may be referred to as hop 0: a first hop of the synchronization timing from the first UE (UE-1) to another UE (e.g., the second UE (UE-2)). The second UE (UE-2) transmits its synchronization signal via the second synchronization resource R-2. This transmission may be referred to as hop 1. The third UE (UE-3) transmits its synchronization signal via the first synchronization resource R-1. This transmission may be referred to as hop 2. The fourth UE (UE-4) transmits its synchronization signal via the second synchronization resource R-2, and so on. This transmission may be referred to as hop 3, and so on.

Each of the synchronization signal transmissions is assigned a priority. A synchronization signal transmission from the GNSS satellite is assigned the highest priority (P0). A synchronization signal transmission from the first UE (UE-1) is assigned a lower priority (P1). A synchronization signal transmission from the second UE (UE-2) is assigned a still lower priority (P2). Synchronization signal transmissions from the third UE (UE-3), the fourth UE (UE-4), and the fifth UE (UE-5) are assigned lower priorities based on the priority P2.

In some examples, these priorities are representative of the accuracy of the transmitted synchronization signals. For example, since the third UE (UE-3) is a larger the number of hops away from the synchronization source than the first UE (UE-1), a synchronization signal transmission from the third UE (UE-3) will have a lower priority than a synchronization signal transmission from the first UE (UE-1).

Table 1 also illustrates the sidelink synchronization signal identifiers (SLSS IDs) assigned to each of the UEs. In this case, the first UE (UE-1) and the second UE (UE-2) are assigned an SLSS ID of 0. The remaining UEs are assigned an SLSS ID of 366.

The following observations may be made based on Table 1. Hop 0 (S-SSB from UE-1) is on Resource-1, in-coverage=true, and the SLSS ID=0. Hop 1 (S-SSB from UE-2) is on Resource-2, in-coverage=false, and the SLSS ID=0. The S-SSBs from UEs-4/6/8 . . . will be single frequency networked (SFN'ed) on Resource-2 (in-coverage=false, SLSS ID=336). The S-SSBs from UEs-3/5/7 . . . will be SFN'ed on Resource-1 (in-coverage=false, SLSS ID=336).

Table 2 illustrates an example of how synchronization resources may be allocated to sidelink devices (e.g., in the example of FIG. 7) in a scenario where a gNB is the synchronization source (e.g., the synchronization source 702). In this case, the synchronization signal transmission from the gNB is designated as priority P3/4/5 or as P0'/1'/2'. Similar to Table 1, two synchronization resources (R-1 and R-2) are allocated in Table 2. In this case, the first UE (UE-1) and the second UE (UE-1) may be assigned an SLSS ID ranging from 1 to 335. The remaining UEs are assigned an SLSS ID equal to the SLSS ID of the first UE (UE-1) plus 336. For example, if the SLSS ID of the first UE (UE-1)=1, the SLSS ID of the third UE (UE-3)=337.

TABLE 2

| Priority | Sync Tx | Resource | In-coverage | SLSS ID |
| --- | --- | --- | --- | --- |
| P3/P0' | gNB | — | — | — |
| P4/P1' | UE-1 | R-1 | True | ID = [1-335] |
| P5/P2' | UE-2 | R-2 | False | Same ID as UE1 |
|  | UE-3 | R-1 | False | ID + 336 |
|  | UE-4 | R-2 | False | ID + 336 |
| . . . |  |  |  |  |

It may be observed that the resource usage for the gNB synchronization source scenario (Table 2) is similar to the resource usage for the GNSS synchronization source scenario (Table 1).

In both scenarios, S-SSBs from multiple sidelink devices may be sent on the same resource. Consequently, a first sidelink device may have difficulty receiving an S-SSB from a second sidelink device via a designated resource (e.g., resource R-1) due to S-SSB transmissions on that same resource (e.g., resource R-1) by other sidelink devices. If the first sidelink device is unable to successfully receive the S-SSB and its associated DMRS, the first sidelink device may resort to synchronizing with a sidelink device that provides lower priority synchronization signaling. As a result, the performance of the sidelink network may suffer.

Therefore, in various aspects of the disclosure, a sidelink device may map different hops to the same resources and sequence, but with orthogonal DMRSs. For example, the sidelink device may map hop 0 and hop 2 to the same resources and sequence, but with orthogonal DMRSs. Similarly, the sidelink device may map hop 1 and hop 3 to the same resources and sequence, but with orthogonal DMRSs.

In a first aspect, a sidelink device may initialize a DMRS sequence generator based on a first sidelink identifier. As one example, the first sidelink identifier may be $N_{ID,1}^{SL}$ and the DMRS sequence generator initialization parameter may be $c_{init}$. In this case, hop 0 and hop 2 (which are allocated to the same resource R-1) will have the same sequence initialization because they have the same first sidelink identifier (e.g., SLSS ID=0 for the GNSS scenario or the same SLSS ID 1-355 for the gNB scenario). The first sidelink identifier and/or the initialization parameter may take other forms in other examples.

An example of a DMRS sequence generator follows. Other DMRS sequence generators may be used in other examples. Here, it may be seen that $c_{init}$ is an initializer for the DMRS sequence generator. Specifically, the parameter $x_2(n)$ of the pseudo-random sequence $c(n)$ is initialized with $c_{init}$. The sequence r(m) (e.g., the sequence used to modulate sidelink reference signals such as the S-SS/PSBCH block) may be generated based on the pseudo-random sequence c(n).

For example, the reference-signal sequence r(m) for an S-SS/PSBCH block may be defined by:

$$r(nm) = \frac{1}{\sqrt{2}}(1 - 2 \times c(2m)) + j\frac{1}{\sqrt{2}}(1 - 2 \times c(2m+1)) \quad \text{EQUATION 4}$$

The parameter c(n) is a pseudo-random sequence. A 31 element pseudo-random sequence c(n) may be generated as follows:

$$c(n)=(x_1(n+N_c)+x_2(n+N_c))\bmod 2, \quad \text{EQUATION 5}$$

where $$x_1(n+31)=(x_1(n+3)+x_1(n))\bmod 2$$

and $$x_2(n+31)=(x_2(n+3)+x_2(n+2)+x_2(n+1)+x_2(n))\bmod 2$$

Here, the sequence x2 is initialized by the initialization parameter $c_{init}$:

$$c_{init} = \sum_{i=0}^{30} x_2(i) \times 2^i \quad \text{EQUATION 6}$$

An initialization value (e.g., $c_{init}$) may be based on a first sidelink identifier (e.g., $N_{ID,1}^{SL}$) in different ways in different examples. In some scenarios, the initialization value is set equal to the first sidelink identifier (e.g., $c_{init}=N_{ID,1}^{SL}$). For example, a sequence generator may be initialized at the start of each S-SS/PSBCH block with $c_{init}=N_{ID,1}^{SL}$.

In other scenarios, the initialization value may be set based on the first sidelink identifier and another value (e.g., $c_{init}=M \times N_{ID,1}^{SL}$). In some examples, this other value may be defined (e.g., specified by a wireless communication standard such as one of the 3GPP specifications). In some examples, this other value may be configured (e.g., by a gNB). For example, a gNB may transmit a Radio Resource Control (RRC) message or some other message to a sidelink device to configure the sidelink device with the other value. In some examples, this other value may be pre-configured (e.g., when an integrated circuit for a sidelink device is manufactured, tested, powered-on, etc.). For example, a programming circuit may send an RRC message or some other message to the sidelink device to configure the sidelink device with the other value.

In a second aspect, a sidelink device may scale a DMRS sequence in conjunction with mapping a DMRS to resource elements (REs). For example, the sidelink device may scale the DMRS sequence with at least one scaling parameter.

In some examples, the sidelink device may apply a frequency-domain cover code (e.g., an orthogonal cover code (OCC)) when mapping the DMRS sequence to resource elements (REs). In some examples, the cover code may be based on a second sidelink identifier (e.g., $N_{ID,2}^{SL}$).

In an example that uses an OCC, different hops may use orthogonal sequences. For example, a sidelink device may apply an OCC when mapping a DMRS sequence to REs such that hop 0 and hop 2 use orthogonal resources. As another example, a sidelink device may apply an OCC when mapping a DMRS sequence to REs such that hop 1 and hop 3 use orthogonal resources.

Thus, when a sidelink device maps different hops to the same resources and sequence, the sidelink device may use scaling as discussed herein so that the different hops use orthogonal DMRSs. Accordingly, a first sidelink device may be able to effectively receive an S-SSB from a second sidelink device via a designated resource (e.g., resource R-1) even when there are S-SSB transmissions on that same resource (e.g., resource R-1) by another sidelink device, provided that the first sidelink device and the other sidelink device use orthogonal resources. Thus, the first sidelink device is more likely to receive the S-SSB and its associated DMRS in such a scenario as compared to a scenario where the first sidelink device and the other sidelink device do not use orthogonal resources.

The scaling described herein may be used in conjunction with different techniques of mapping different hops to the same resources and sequence. In some examples, the DMRS sequence generator initialization technique described herein may be used to map different hops to the same resources and sequence. In some examples, a fixed initialization parameter may be used (e.g., for hop 0 and 2) so that the hops will map to the same sequence. In some examples, the initialization parameter to be used (e.g., for hop 0 and 2) may be signaled to the sidelink devices (e.g., via RRC signaling from a gNB) so that the hops will map to the same sequence. In any of these scenarios, scaling as taught herein (e.g., application of an OCC) may be used so that different hops are mapped to the same resources and sequence, but use orthogonal DMRSs.

A detailed example of scaling based on a second sidelink identifier follows. Other types of scaling may be used in other examples.

When mapping a symbol r(x) (referred to as r(m) in Equation 4 above) from a sequence to REs in symbol l and sub-carrier k, the sequence r(x) may be scaled by a factor $\beta_{PSBCH}^{DMRS}$ to conform with the specified transmission power and to map to resource elements $(k,l)_{p,\mu}$ according to:

$$A_{k,l}^{(p,\mu)} = \beta_{PSBCH}^{DMRS} w_f(l') r(2n+k') \quad \text{EQUATION 7}$$

In some examples, when mapping a symbol r(x) from a sequence to REs in symbol l and sub-carrier k, a sidelink device may further scale the symbol r(x) by a factor w(k), where the value of w(k) depends at least in some aspects on the second sidelink identifier (e.g., $N_{ID,2}^{SL}$). Tables 3A, 3B, 4, and 5 illustrate three examples of w(k).

Table 3A or Table 3B may be used, for example, for a scenario where there are two possible values (e.g., 0 and 1) for $N_{ID,2}^{SL}$. In some examples, the first column of w(k) may be used for even values of k (k mode 2=0) while the second column of w(k) is used for odd values of k (k mode 2=1).

In some examples, a sequence of complex-values symbols r(0), ... , r(XXX) constituting the demodulation reference signals for the S-SS/PSBCH block may be scaled by a factor of $\beta_{PSBCH}^{DMRS}$ to conform to a specified PSBCH power allocation, scaled by a factor w(k) given in Table 3A or 3B, and mapped to resource elements $(k,l)_{p,\mu}$ n increasing order of first k and then l where k and l represent the frequency and time indices, respectively, within one S-SS/PSBCH block.

TABLE 3A

| $N_{SL,2}^{ID}$ | w(k) | |
| --- | --- | --- |
| | k mod 2 = 0 | k mod 2 = 2 |
| 0 | 1 | 1 |
| 1 | 1 | −1 |

TABLE 3B

| $N_{SL,2}^{ID}$ | w(k) | |
| --- | --- | --- |
| | k/4 mod 2 = 0 | k/4 mod 2 = 2 |
| 0 | 1 | 1 |
| 1 | 1 | −1 |

Tables 4 and 5 may be used for, example, for a scenario where there are more than two possible values for $N_{ID,2}^{SL}$. In some examples, the w(k) values of Table 4 may provide good orthogonality, but with an increased complexity in implementation. In some examples, the w(k) values of Table 5 may provide an easier implementation (since only +1 and −1 values are used) with less orthogonality.

TABLE 4

| $N_{SL,2}^{ID}$ | w(k) | | |
| --- | --- | --- | --- |
| | k/4 mod 3 = 0 | k/4 mod 3 = 1 | k/4 mod 3 = 2 |
| 00 | +1 | +1 | +1 |
| 01 | +1 | $e^{j2\pi/3}$ | $e^{j4\pi/3}$ |
| 10 | +1 | $e^{j4\pi/3}$ | $e^{j2\pi/3}$ |

TABLE 5

| $N_{SL,2}^{ID}$ | w(k) | | |
| --- | --- | --- | --- |
| | k/4 mod 3 = 0 | k/4 mod 3 = 1 | k/4 mod 3 = 2 |
| 0 | +1 | +1 | +1 |
| 1 | +1 | +1 | +1 |

A scaling parameter may be based on a second sidelink identifier (e.g., $N_{ID,2}^{SL}$) in different ways in different examples. In some scenarios, at least one scaling parameter is set based on the value of the sidelink identifier (e.g., as shown in Tables 3-5). In other scenarios, at least one scaling parameter may be set based on the first sidelink identifier and another value. In some examples, this other value may be defined (e.g., specified by a wireless communication standard such as one of the 3GPP specifications). In some examples, this other value may be configured (e.g., by a gNB). For example, a gNB may transmit a Radio Resource Control (RRC) message or some other message to a sidelink device to configure the sidelink device with the other value. In some examples, this other value may be pre-configured (e.g., when an integrated circuit for a sidelink device is manufactured, tested, powered-on, etc.). For example, a programming circuit may send an RRC message or some other message to the sidelink device to configure the sidelink device with the other value.

Figure 8:
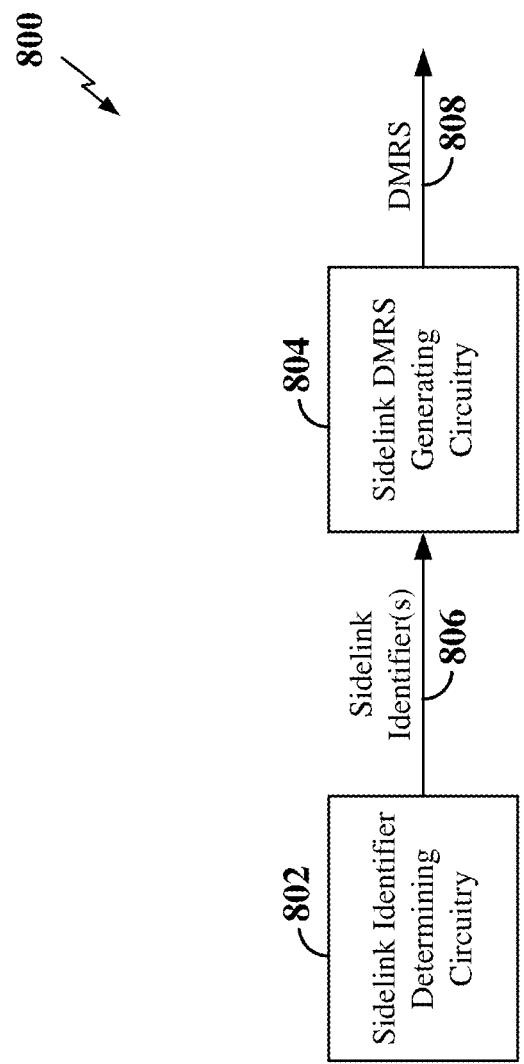
FIG. 8 is a block diagram illustrating an example of sidelink communication circuitry according to some aspects.

FIG. 8 is a block diagram illustrating an example of sidelink communication circuitry 800 than may be configured to perform any of the DMRS generating-related operations discussed herein. The sidelink communication circuitry 800 includes sidelink identifier determining circuitry 802 and sidelink DMRS generating circuitry 804.

The sidelink identifier determining circuitry 802 may be configured to determine a first sidelink identifier and/or a second sidelink identifier for a sidelink device. For example, the sidelink identifier determining circuitry 802 may determine $N_{ID,1}^{SL}$ and $N_{ID,2}^{SL}$. In some examples, the sidelink identifier determining circuitry 802 may retrieve the identifiers from a memory (e.g., from a memory location where identifier information configured for the sidelink device is stored). The sidelink identifier determining circuitry 802 outputs the determined sidelink identifier(s) 806 to the sidelink DMRS generating circuitry 804.

The sidelink DMRS generating circuitry 804 may be configured to generate a DMRS 808 based on the sidelink identifier(s) 806. In some examples, the sidelink DMRS generating circuitry 804 may be configured to perform any of the DMRS generating operations discussed herein. Several non-limiting examples of this functionality follow.

In some examples, the sidelink DMRS generating circuitry 804 may determine an initialization parameter based at least on the first sidelink identifier and use the initialization parameter to generate the DMRS.

In some examples, the sidelink DMRS generating circuitry 804 may determine an initialization parameter based at least on the first sidelink identifier, initialize a sequence generator with the initialization parameter, generate a pseudo-random sequence using the sequence generator, and generate the DMRS from the pseudo-random sequence.

In some examples, the sidelink DMRS generating circuitry 804 may generate a sequence, determine at least one scaling parameter based at least on the second sidelink identifier, and scale the sequence with the at least one scaling parameter to generate the DMRS.

In some examples, the sidelink DMRS generating circuitry 804 may generate a sequence, determine a frequency-domain cover code based at least on the second sidelink identifier, and apply the frequency-domain cover code to the sequence to generate the DMRS.

In some examples, the sidelink DMRS generating circuitry 804 may determine an initialization parameter based at least on the first sidelink identifier, generate a sequence using the initialization parameter, determine at least one scaling parameter based at least on the second sidelink identifier, and scale the sequence with the at least one scaling parameter to generate the DMRS.

In some examples, the sidelink DMRS generating circuitry 804 may determine an initialization parameter based at least on the first sidelink identifier, initialize a sequence generator with the initialization parameter, generate a pseudo-random sequence using the sequence generator, generate a first sequence from the pseudo-random sequence, determine a frequency-domain orthogonal cover code (OCC) based at least on the second sidelink identifier, and apply the frequency-domain OCC to the first sequence to generate the DMRS.

In some examples, the sidelink DMRS generating circuitry 804 may determine at least one of an initialization parameter based at least on a first sidelink identifier for the first sidelink device, at least one scaling parameter based at least on a second sidelink identifier for the first sidelink device, or a combination thereof, and generate a demodulation reference signal (DMRS) using at least one of the initialization parameter, the at least one scaling parameter, or a combination thereof.

In some examples, the sidelink DMRS generating circuitry 804 may initialize a sequence generator with the initialization parameter, generate a pseudo-random sequence using the sequence generator, and generate the DMRS from the pseudo-random sequence.

In some examples, the sidelink DMRS generating circuitry 804 may generate a sequence, and scale the sequence with the at least one scaling parameter to generate the DMRS.

In some examples, the sidelink DMRS generating circuitry 804 may determine a parameter for a sequence generator, initialize the sequence generator with the parameter, generate a pseudo-random sequence using the sequence generator, and generate the DMRS from the pseudo-random sequence.

In some examples, the sidelink DMRS generating circuitry 804 may receive a parameter for a sequence generator via a radio resource control (RRC) message, initialize the sequence generator with the parameter, generate a pseudo-random sequence using the sequence generator, and generate the DMRS from the pseudo-random sequence.

In some examples, the sidelink DMRS generating circuitry 804 may initialize a sequence generator with the initialization parameter, generate a pseudo-random sequence using the sequence generator, generate a first sequence from the pseudo-random sequence, determine a frequency-domain orthogonal cover code (OCC) based at least on the second sidelink identifier, and apply the frequency-domain OCC to the first sequence to generate the DMRS.

Figure 9:
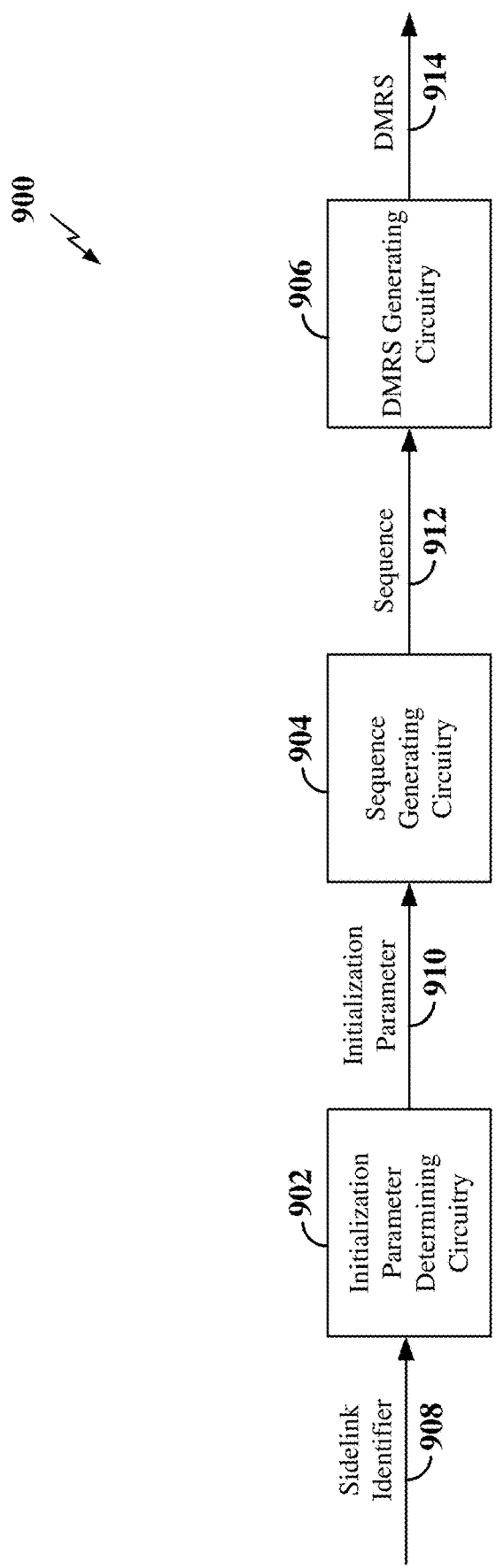
FIG. 9 is a block diagram illustrating an example of sidelink communication circuitry according to some aspects.

FIG. 9 is a block diagram illustrating an example of sidelink communication circuitry 900 than may be configured to perform one or more of the DMRS generating-related operations discussed herein. In some examples, the sidelink communication circuitry 900 may be part of the sidelink communication circuitry 800 of FIG. 8. The sidelink communication circuitry 900 includes initialization parameter determining circuitry 902, sequence generating circuitry 904, and DMRS generating circuitry 906.

The initialization parameter determining circuitry 902 may be configured to determine an initialization parameter for the sequence generating circuitry 904. In some examples, the initialization parameter determining circuitry 902 determines an initialization parameter based on a first sidelink identifier for a sidelink device. For example, the initialization parameter determining circuitry 902 may determine $c_{init}$ based on $N_{ID,1}^{SL}$. In some examples, the initialization parameter may be a determined seed parameter (e.g., a parameter that is selected by a sidelink device) or a received seed parameter (e.g., a parameter that is received at a sidelink device). The initialization parameter determining circuitry 902 outputs the determined initialization parameter 910 to the sequence generating circuitry 904.

The sequence generating circuitry 904 may be configured to generate a sequence based on the initialization parameter 910. In some examples, the sequence generating circuitry 904 may be configured to perform any of the sequence-generating operations discussed herein. Several non-limiting examples of this functionality follow. In some examples, the sequence generating circuitry 904 may initialize a sequence generator with the initialization parameter, and generate a sequence (e.g., a pseudo-random sequence) using the sequence generator. In some examples, the sequence generating circuitry 904 may include (e.g., may be) the sequence generator. The sequence generating circuitry 904 outputs the generated sequence 912 to the DMRS generating circuitry 906.

The DMRS generating circuitry 906 may be configured to generate a DMRS 914 based on the sequence 912. In some examples, the DMRS generating circuitry 906 may be configured to perform one or more of the DMRS generating operations discussed herein. Several non-limiting examples of this functionality follow. In some examples, the DMRS generating circuitry 906 may generate the DMRS from a pseudo-random sequence. In some examples, the DMRS generating circuitry 906 may determine at least one scaling parameter based at least on the second sidelink identifier, and scale the sequence with the at least one scaling parameter to generate the DMRS. In some examples, the DMRS generating circuitry 906 may determine a frequency-domain cover code based at least on the second sidelink identifier, and apply the frequency-domain cover code to the sequence to generate the DMRS. In some examples, the DMRS generating circuitry 906 may determine at least one scaling parameter based at least on the second sidelink identifier, and scale the sequence with the at least one scaling parameter to generate the DMRS. In some examples, the DMRS generating circuitry 906 may generate a first sequence from the pseudo-random sequence, determine a frequency-domain orthogonal cover code (OCC) based at least on the second sidelink identifier, and apply the frequency-domain OCC to the first sequence to generate the DMRS. In some examples, the DMRS generating circuitry 906 may generate a demodulation reference signal (DMRS) using at least one of the initialization parameter, at least one scaling parameter, or a combination thereof.

Figure 10:
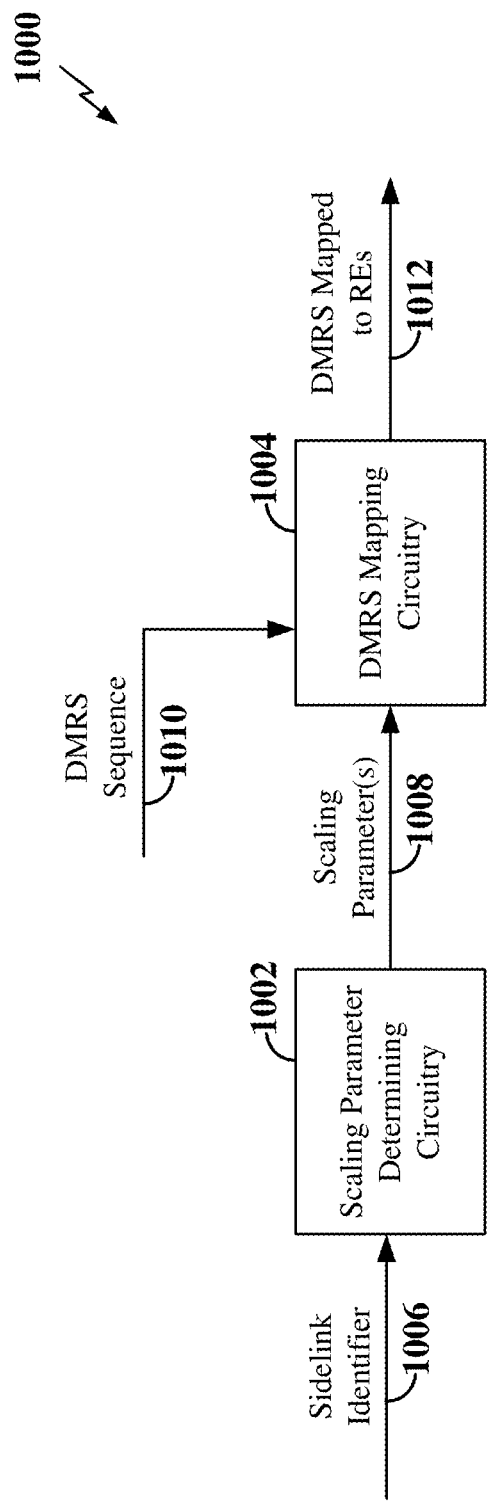
FIG. 10 is a block diagram illustrating an example of sidelink communication circuitry according to some aspects.

FIG. 10 is a block diagram illustrating an example of sidelink communication circuitry 1000 that may be configured to perform one or more of the DMRS scaling-related operations and/or the DMRS mapping-related operations discussed herein. In some examples, the sidelink communication circuitry 1000 may be part of the sidelink communication circuitry 800 of FIG. 8. The sidelink communication circuitry 1000 includes scaling parameter determining circuitry 1002 and DMRS mapping circuitry 1004.

The scaling parameter determining circuitry 1002 may be configured to determine a scaling parameter for the DMRS mapping circuitry 1004. In some examples, the scaling parameter determining circuitry 1002 determines at least one scaling parameter based on a sidelink identifier 1006 for a sidelink device. For example, the scaling parameter determining circuitry 1002 may determine w(k) based on $N_{ID,2}^{SL}$. In some examples, the at least one scaling parameter may be a frequency-domain cover code. In some examples, the at least one scaling parameter may be a frequency-domain orthogonal cover code. The scaling parameter determining circuitry 1002 outputs the determined scaling parameter(s) 1008 to the DMRS mapping circuitry 1004.

The DMRS mapping circuitry 1004 may be configured to map a DMRS sequence 1010 to REs 1012. In some examples, the DMRS sequence may be the sequence 912 of FIG. 9. In some examples, the DMRS mapping circuitry 1004 may scale the DMRS sequence(s) 1010 with the scaling parameter(s) 1008 to generate a DMRS for transmission. In some examples, the DMRS mapping circuitry 1004 may apply a frequency-domain cover code to the DMRS sequence(s) 1010 to generate a DMRS for transmission. In some examples, the cover code may be a frequency-domain orthogonal cover code.

Figure 11:
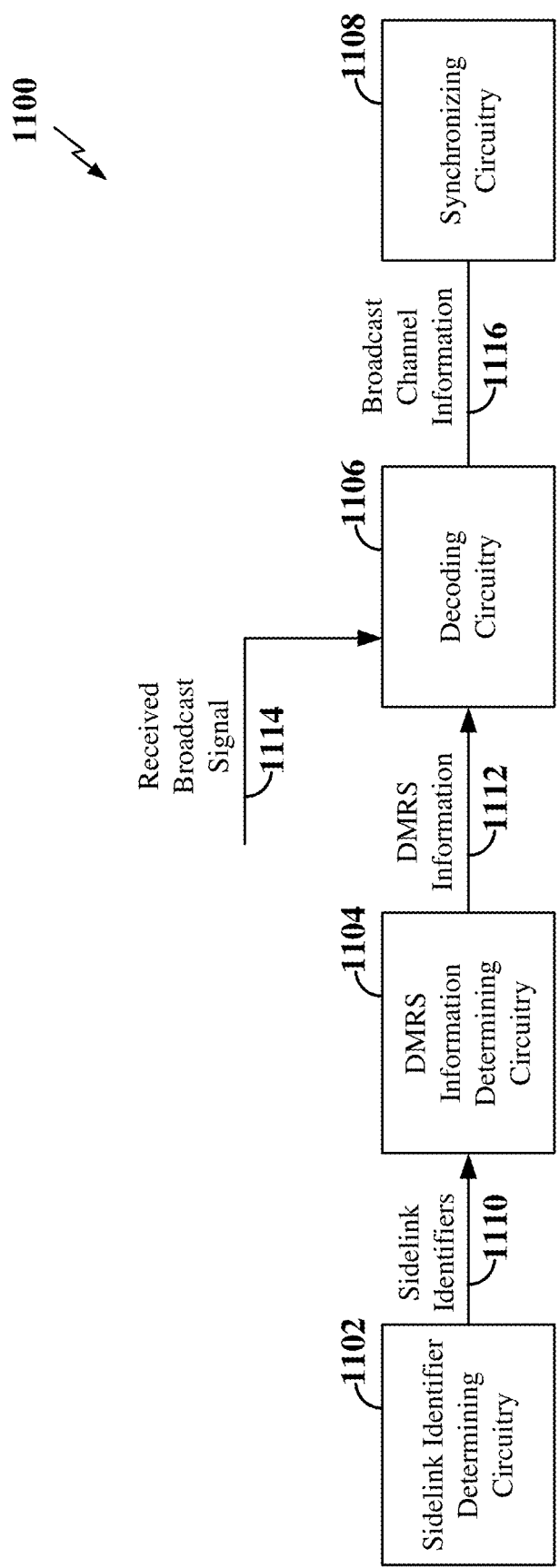
FIG. 11 is a block diagram illustrating an example of sidelink communication circuitry according to some aspects.

FIG. 11 is a block diagram illustrating an example of sidelink communication circuitry 1100 that may be configured to perform any of the DMRS-based synchronizing-related operations discussed herein. The sidelink communication circuitry 1100 includes sidelink identifier determining circuitry 1102, DMRS information determining circuitry 1104, decoding circuitry 1106, and synchronizing circuitry 1108.

The sidelink identifier determining circuitry 1102 may be configured to determine a first sidelink identifier and/or a second sidelink identifier for a sidelink device. For example, the sidelink identifier determining circuitry 1102 may derive $N_{ID,1}^{SL}$ from an S-SSS and derive $N_{ID,2}^{SL}$ from S-PSS and/or S-SSS. The sidelink identifier determining circuitry 1102 outputs the determined sidelink identifier(s) 1110 to the DMRS information determining circuitry 1104.

The DMRS information determining circuitry 1104 may be configured to determine the DMRS sequence that is associated with a received broadcast signal 1114. In some examples, the DMRS information determining circuitry 1104 may determine DMRS information based on the sidelink identifier 1110. In some examples, the DMRS information determining circuitry 1104 may be configured to perform one or more of the DMRS determining or generating operations discussed herein. Several non-limiting examples of this functionality follow.

In some examples, the DMRS information determining circuitry 1104 may determine an initialization parameter based at least on the first sidelink identifier, and use the initialization parameter to generate the DMRS information.

In some examples, the DMRS information determining circuitry 1104 may determine an initialization parameter based at least on the first sidelink identifier, initialize a sequence generator with the initialization parameter, generate a pseudo-random sequence using the sequence generator, and generate the DMRS information from the pseudo-random sequence.

In some examples, the DMRS information determining circuitry 1104 may generate a sequence, determine at least one scaling parameter based at least on the second sidelink identifier, and scale the sequence with the at least one scaling parameter to generate the DMRS information.

In some examples, the DMRS information determining circuitry 1104 may generate a sequence, determine a frequency-domain cover code based at least on the second sidelink identifier, and apply the frequency-domain cover code to the sequence to generate the DMRS information.

In some examples, the DMRS information determining circuitry 1104 may determine an initialization parameter based at least on the first sidelink identifier, generate a sequence using the initialization parameter, determine at least one scaling parameter based at least on the second sidelink identifier, and scale the sequence with the at least one scaling parameter to generate the DMRS information.

In some examples, the DMRS information determining circuitry 1104 may determine an initialization parameter based at least on the first sidelink identifier, initialize a sequence generator with the initialization parameter, generate a pseudo-random sequence using the sequence generator, generate a first sequence from the pseudo-random sequence, determine a frequency-domain orthogonal cover code (OCC) based at least on the second sidelink identifier, and apply the frequency-domain OCC to the first sequence to generate the DMRS information.

The DMRS information determining circuitry 1104 outputs the determined DMRS information 1112 to the decoding circuitry 1106. The decoding circuitry 1106 may be configured to decode a received broadcast signal 1114 based on the DMRS information 1112. In some examples, the decoding circuitry 1106 uses the DMRS information 1112 for channel estimation and demodulation of the received broadcast signal 1114. The decoding circuitry 1106 outputs decoded broadcast channel information 1116 based on the received broadcast signal 1114 to the synchronizing circuitry 1108.

The synchronizing circuitry 1108 may be configured to synchronize with a sidelink device using the broadcast channel information 1116. In some examples, the synchronizing circuitry 1108 determines which sidelink device has the best synchronization signal priority based on the broadcast channel information 1116 (e.g., based on information carried by a master information block (MIB) 1 or another system information block identified via MIB 1). The synchronizing circuitry 1108 may then invoke a synchronization procedure whereby the timing of a sidelink device that includes the synchronizing circuitry 1108 synchronizes its timing with the timing of the sidelink device that has the best synchronization signal priority.

Figure 12:
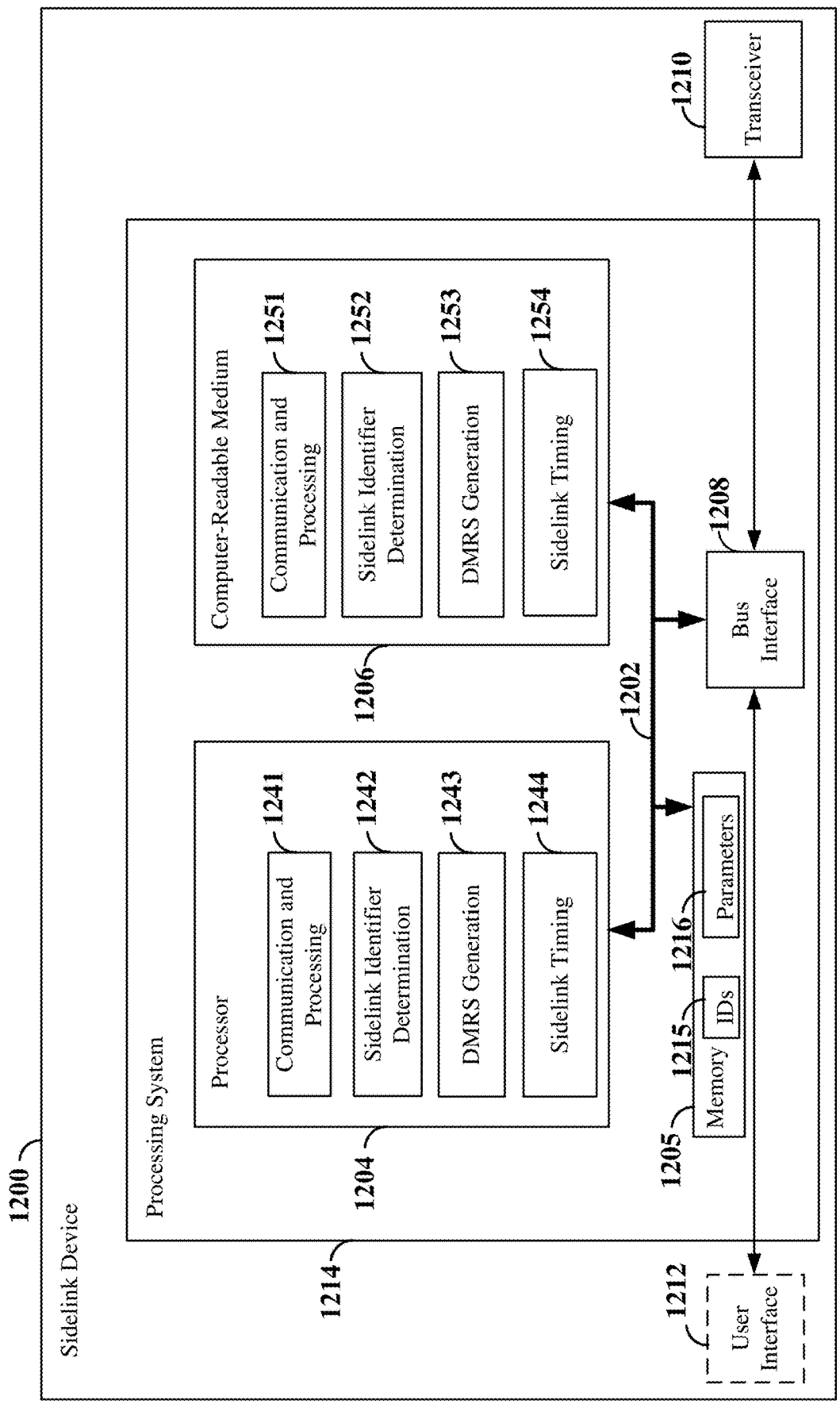
FIG. 12 is a diagram illustrating an example of a hardware implementation for a sidelink device employing a processing system according to some aspects.

FIG. 12 is a block diagram illustrating an example of a hardware implementation for a sidelink device 1200 employing a processing system 1214. For example, the sidelink device 1200 may correspond to any of the sidelink devices, UEs, or scheduled entities shown in any of FIGS. 1, 2, 3, 7, and 15.

The sidelink device 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the sidelink device 1200 may be configured to perform any one or more of the functions described herein. That is, the processor 1204, as utilized in the sidelink device 1200, may be used to implement any one or more of the processes and procedures described below.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 links together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further.

A bus interface 1208 provides an interface between the bus 1202 and a transceiver 1210. The transceiver 1210 provides a means for communicating with various other apparatus over a transmission medium (e.g., air interface). Depending upon the nature of the apparatus, a user interface 1212 (e.g., keypad, display, touch screen, speaker, microphone, control knobs, etc.) may also be provided. Of course, such a user interface 1212 is optional, and may be omitted in some examples.

The processor 1204 is responsible for managing the bus 1202 and general processing, including the execution of software stored on the computer-readable medium 1206. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 1204, causes the processing system 1214 to perform the various functions described below for any particular apparatus. The computer-readable medium 1206 and the memory 1205 may also be used for storing data that is used and/or manipulated by the processor 1204 when executing software. For example, the memory 1205 may store IDs 1215 (e.g., sidelink device identifiers) and parameters 1216 (e.g., initialization and scaling parameters) used by the processor 1204 for generating a sequence.

The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. In some examples, the computer-readable medium 1206 may be part of the memory 1205. Those skilled in the art will recognize how best to implement the described functionality presented throughout this disclosure depending on the particular application and the overall design constraints imposed on the overall system.

In some aspects of the disclosure, the processor 1204 may include circuitry configured for various functions. For example, the processor 1204 may include communication and processing circuitry 1241 configured to communicate over a sidelink carrier to exchange sidelink control information and sidelink data with other sidelink devices. In some examples, the communication and processing circuitry 1241 may be configured to transmit a PSCCH, which may include a sidelink synchronization signal block (S-SSB), other control information, and/or pilot signals, and/or a PSSCH, which may include sidelink data, within a radio frame based on sidelink transmission timing. In some examples, the sidelink transmission timing may be determined based on synchronization to a synchronization source (e.g., gNB, eNB, GNSS, etc.), self-synchronization to an internal timing/frequency reference, or synchronization to another sidelink device (e.g., based on a received S-SS as described herein). The communication and processing circuitry 1241 may further be configured to execute communication and processing software 1251 stored on the computer-readable medium 1206 to implement one or more functions described herein.

In some implementations where the communication involves receiving information, the communication and processing circuitry 1241 may obtain information from a component of the sidelink device 1200 (e.g., from the transceiver 1210 that receives the information via radio frequency signaling or some other type of signaling suitable for the applicable communication medium), process (e.g., decode) the information, and output the processed information. For example, the communication and processing circuitry 1241 may output the information to another component of the processor 1204, to the memory 1205, or to the bus interface

1208. In some examples, the communication and processing circuitry 1241 may receive one or more of signals, messages, other information, or any combination thereof. In some examples, the communication and processing circuitry 1241 may receive information via one or more channels. In some examples, the communication and processing circuitry 1241 may include functionality for a means for receiving. In some examples, the communication and processing circuitry 1241 may include functionality for a means for decoding.

In some implementations where the communication involves sending (e.g., transmitting) information, the communication and processing circuitry 1241 may obtain information (e.g., from another component of the processor 1204, the memory 1205, or the bus interface 1208), process (e.g., encode) the information, and output the processed information. For example, the communication and processing circuitry 1241 may output the information to the transceiver 1210 (e.g., that transmits the information via radio frequency signaling or some other type of signaling suitable for the applicable communication medium). In some examples, the communication and processing circuitry 1241 may send one or more of signals, messages, other information, or any combination thereof. In some examples, the communication and processing circuitry 1241 may send information via one or more channels. In some examples, the communication and processing circuitry 1241 may include functionality for a means for sending (e.g., a means for transmitting). In some examples, the communication and processing circuitry 1241 may include functionality for a means for encoding.

The processor 1204 may include sidelink identifier determination circuitry 1242 configured to perform sidelink identifier determination-related operations as discussed herein (e.g., one or more of the operations described in conjunction with FIGS. 8-11). In some examples, the sidelink identifier determination circuitry 1242 may include functionality for a means for determining a sidelink identifier. For example, the sidelink identifier determination circuitry 1242 may be configured to maintain and retrieve identifier values in the memory 1205. In some examples, the sidelink identifier determination circuitry 1242 may further be configured to execute sidelink identifier determination software 1252 included on the computer-readable medium 1206 to implement one or more functions described herein.

In some examples, the sidelink identifier determination circuitry 1242 may correspond to the sidelink identifier determining circuitry 802 described above in conjunction with FIG. 8. In some examples, the sidelink identifier determination circuitry 1242 may be configured to determine a first sidelink identifier and/or a second sidelink identifier for a sidelink device. For example, the sidelink identifier determination circuitry 1242 may determine $N_{ID,1}^{SL}$ and $N_{ID,2}^{SL}$.

The processor 1204 may include DMRS generation circuitry 1243 configured to perform DMRS generation-related operations as discussed herein (e.g., one or more of the operations described in conjunction with FIGS. 8-11). In some examples, the DMRS generation circuitry 1243 may include functionality for a means for determining an initialization parameter. In some examples, the DMRS generation circuitry 1243 may include functionality for a means for determining a scaling parameter. In some examples, the DMRS generation circuitry 1243 may include functionality for a means for generating a DMRS. In some examples, the DMRS generation circuitry 1243 may include functionality for a means for transmitting a DMRS. In some examples, the DMRS generation circuitry 1243 may further be configured to execute DMRS generation software 1253 included on the computer-readable medium 1206 to implement one or more functions described herein.

In some examples, the DMRS generation circuitry 1243 may correspond to the sidelink DMRS generating circuitry 804 described above in conjunction with FIG. 8. In some examples, the DMRS generation circuitry 1243 may correspond to the sidelink communication circuitry 900 described above in conjunction with FIG. 9. In some examples, the DMRS generation circuitry 1243 may correspond to the sidelink communication circuitry 1000 described above in conjunction with FIG. 10. In some examples, the DMRS generation circuitry 1243 may be configured to determine an initialization parameter based at least on the first sidelink identifier and use the initialization parameter to generate the DMRS. In some examples, the DMRS generation circuitry 1243 may be configured to generate a sequence, determine at least one scaling parameter based at least on the second sidelink identifier, and scale the sequence with the at least one scaling parameter to generate the DMRS.

The processor 1204 may include sidelink timing circuitry 1244 configured to perform sidelink timing-related operations as discussed herein (e.g., one or more of the operations described in conjunction with FIGS. 8-11). In some examples, the sidelink timing circuitry 1244 may include functionality for a means for generating a synchronization signal. In some examples, the sidelink timing circuitry 1244 may further be configured to execute sidelink timing software 1254 included on the computer-readable medium 1206 to implement one or more functions described herein.

The sidelink timing circuitry 1244 may generate an S-SSB as discussed above, for example, in conjunction with FIGS. 6 and 7. For example, the sidelink timing circuitry 1244 may generate an S-SSS based on a first sidelink identifier and second sidelink identifier and generate an S-PSS based on a second sidelink identifier.

Figure 13:
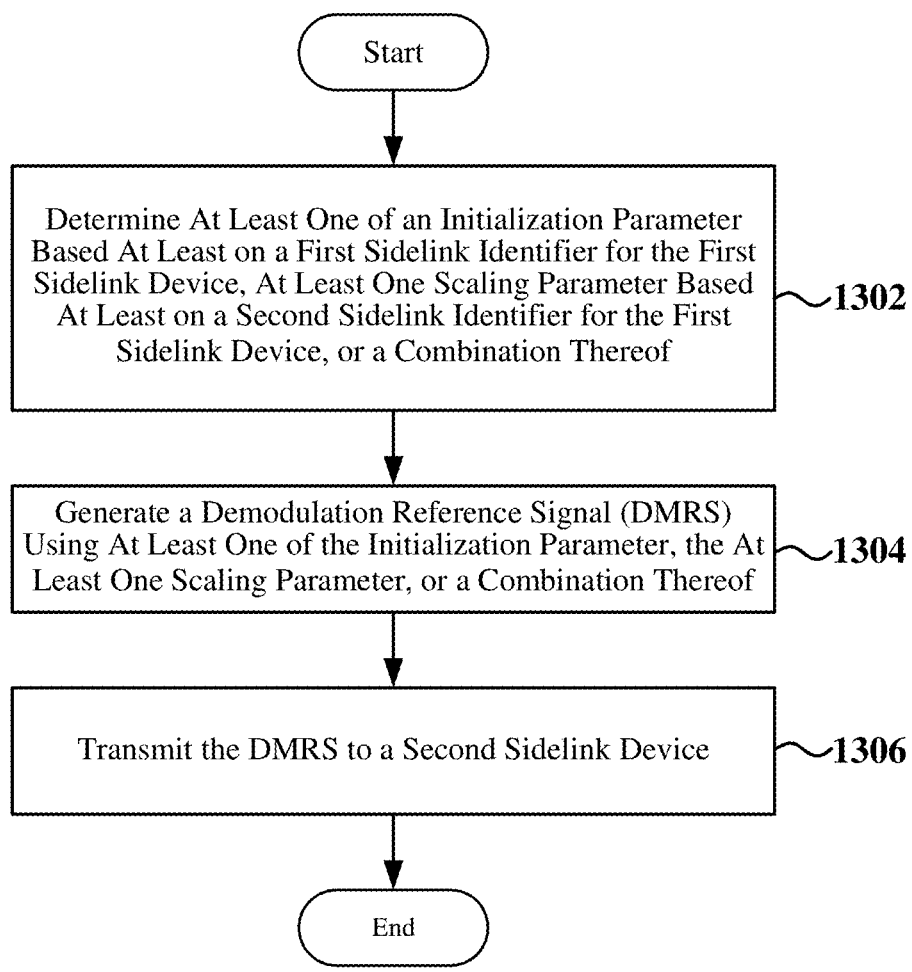
FIG. 13 is a flow chart illustrating an example of a method for providing a demodulation reference signal (DMRS) according to some aspects.

FIG. 13 is a flow chart of a method 1300 for wireless communication over a sidelink carrier. As described below, some or all illustrated features may be omitted in a particular implementation within the scope of the present disclosure, and some illustrated features may not be required for implementation of all examples. In some examples, the method may be performed by the sidelink device 1200, as described above and illustrated in FIG. 12, by a processor or processing system, or by any suitable means for carrying out the described functions.

At block 1302, a first sidelink device may determine at least one of an initialization parameter based at least on a first sidelink identifier for the first sidelink device, at least one scaling parameter based at least on a second sidelink identifier for the first sidelink device, or a combination thereof. For example, the DMRS generation circuitry 1243, shown and described above in connection with FIG. 12, may calculate $c_{init}$ based on $N_{ID,1}^{SL}$ as discussed herein. As another example, the DMRS generation circuitry 1243 may calculate a scaling parameter based on $N_{ID,2}^{SL}$ as discussed herein.

In some examples, the first sidelink identifier is a first value of a set of values from 0 to N. In some examples, the second sidelink identifier is a 0 or a 1.

In some examples, the at least one scaling parameter may include a frequency-domain cover code. In some examples, the cover code is an orthogonal cover code.

In some examples, determining the initialization parameter is further based on a configured value (e.g., the value is configured via signaling sent by a base station). In some examples, determining the initialization parameter is further based on a pre-configured value (e.g., the value is set when an integrated circuit for a sidelink device is manufactured, tested, powered-on, etc.). In some examples, determining the initialization parameter is further based on a defined value (e.g., the value is specified by a wireless communication standard such as one of the 3GPP specifications).

At block 1304, the first sidelink device may generate a demodulation reference signal (DMRS) using (e.g., based on) at least one of the initialization parameter, the at least one scaling parameter, or a combination thereof. For example, the DMRS generation circuitry 1243 may generate a sequence based on $c_{init}$ and/or a scaling parameter and then generate a DMRS based on the sequence as discussed herein.

In some examples, generating the DMRS may include initializing a sequence generator with the initialization parameter, generating a pseudo-random sequence using the sequence generator, and generating the DMRS from the pseudo-random sequence.

In some examples, generating the DMRS may include generating a sequence and scaling the sequence with the at least one scaling parameter to generate the DMRS. In some examples, generating the DMRS may include determining a parameter for a sequence generator, initializing the sequence generator with the parameter, generating a pseudo-random sequence using the sequence generator, and generating the DMRS from the pseudo-random sequence. In some examples, generating the DMRS may include receiving a parameter for a sequence generator via a radio resource control (RRC) message, initializing the sequence generator with the parameter, generating a pseudo-random sequence using the sequence generator, and generating the DMRS from the pseudo-random sequence.

In some examples, generating the DMRS may include initializing a sequence generator with the initialization parameter, generating a pseudo-random sequence using the sequence generator, generating a first sequence from the pseudo-random sequence, determining a frequency-domain orthogonal cover code (OCC) based at least on the second sidelink identifier, and applying the frequency-domain OCC to the first sequence to generate the DMRS.

At block 1306, the first sidelink device may transmit the DMRS to a second sidelink device. For example, the DMRS generation circuitry 1243 together with the communication and processing circuitry 1241 and the transceiver 1210, shown and described above in connection with FIG. 12, may transmit the DMRS on a designated resource as described above, for example, in conjunction with FIGS. 5A and 5B.

In some examples, the method 1300 may further include determining a physical layer sidelink synchronization identifier for the first sidelink device based on the first sidelink identifier and the second sidelink identifier.

Figure 14:
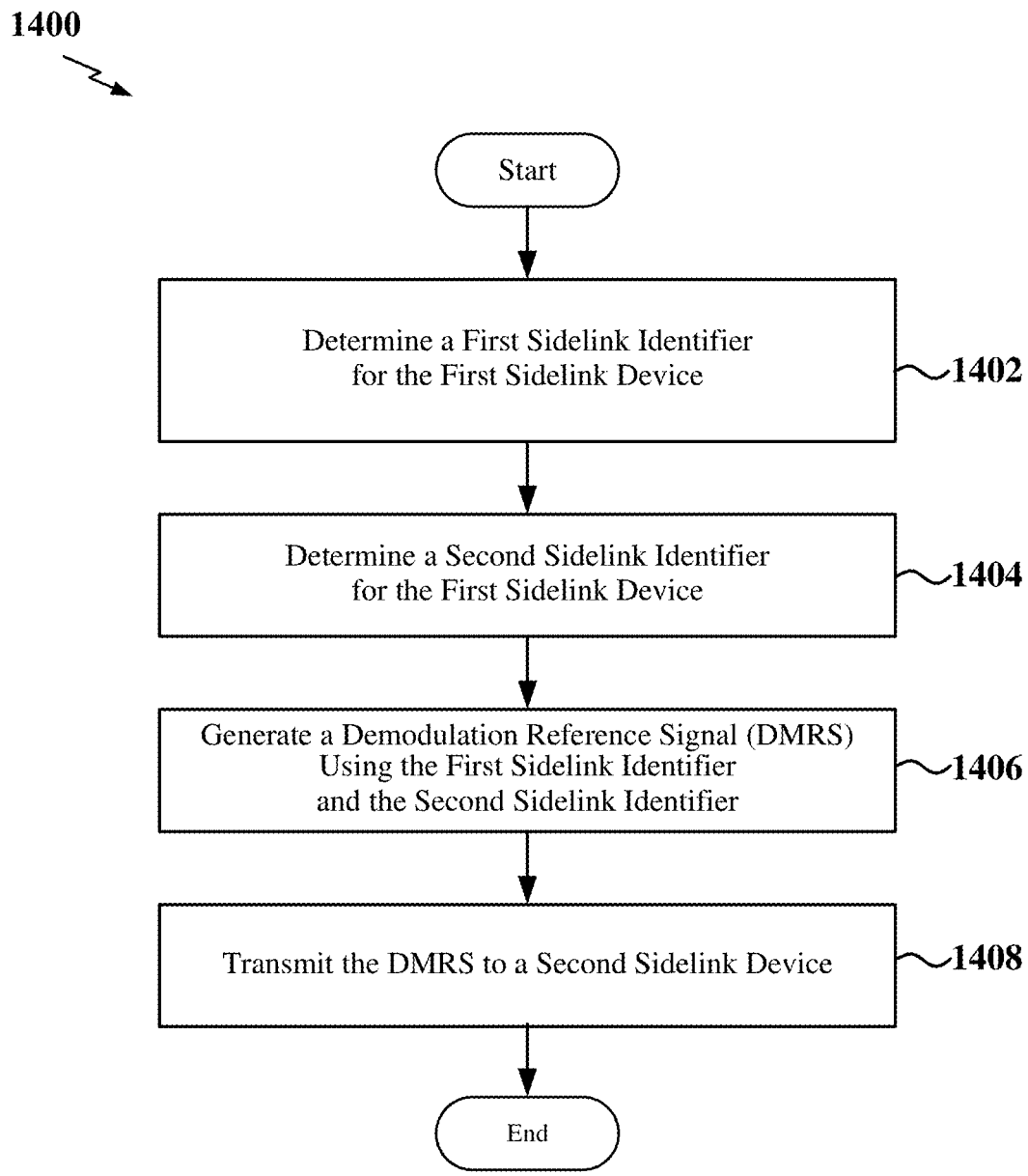
FIG. 14 is a flow chart illustrating an example of a method for providing a DMRS according to some aspects.

FIG. 14 is a flow chart of a method 1400 for wireless communication over a sidelink carrier. As described below, some or all illustrated features may be omitted in a particular implementation within the scope of the present disclosure, and some illustrated features may not be required for implementation of all examples. In some examples, the method may be performed by the sidelink device 1200, as described above and illustrated in FIG. 12, by a processor or processing system, or by any suitable means for carrying out the described functions.

At block 1402, a first sidelink device may determine a first sidelink identifier for the first sidelink device. In some examples, the first sidelink identifier is a first value of a set of values from 0 to N. For example, the sidelink identifier determination circuitry 1242, shown and described above in connection with FIG. 12, may retrieve the $N_{ID,1}^{SL}$ ID from the memory 1205.

At block 1404, the first sidelink device may determine a second sidelink identifier for the first sidelink device. In some examples, the second sidelink identifier is a 0 or a 1. For example, the sidelink identifier determination circuitry 1242 may retrieve the $N_{ID,2}^{SL}$ ID from the memory 1205.

At block 1406, the first sidelink device may generate a demodulation reference signal (DMRS) using (e.g., based on) the first sidelink identifier and the second sidelink identifier. For example, the DMRS generation circuitry 1243, shown and described above in connection with FIG. 12, may calculate $c_{init}$ based on $N_{ID,1}^{SL}$ and calculate a scaling parameter based on $N_{ID,2}^{SL}$ as discussed herein. The DMRS generation circuitry 1243 may then generate a sequence based on these values and generate a DMRS based on the sequence.

In some examples, generating the DMRS may include determining an initialization parameter based at least on the first sidelink identifier, and using the initialization parameter to generate the DMRS.

In some examples, generating the DMRS may include determining an initialization parameter based at least on the first sidelink identifier, initializing a sequence generator with the initialization parameter, generating a pseudo-random sequence using the sequence generator (e.g., the sequence generator is used to generate the sequence), and generating the DMRS from the pseudo-random sequence. In some examples, determining the initialization parameter is further based on a configured value (e.g., the value is configured via signaling sent by a base station). In some examples, determining the initialization parameter is further based on a pre-configured value (e.g., the value is set when an integrated circuit for a sidelink device is manufactured, tested, powered-on, etc.). In some examples, determining the initialization parameter is further based on a defined value (e.g., the value is specified by a wireless communication standard such as one of the 3GPP specifications).

In some examples, generating the DMRS may include generating a sequence, determining at least one scaling parameter based at least on the second sidelink identifier, and scaling the sequence with the at least one scaling parameter to generate the DMRS.

In some examples, generating the DMRS may include generating a sequence, determining a frequency-domain cover code based at least on the second sidelink identifier, and applying the frequency-domain cover code to the sequence to generate the DMRS. In some examples, the cover code may be an orthogonal cover code.

In some examples, generating the DMRS may include determining an initialization parameter based at least on the first sidelink identifier, generating a sequence using (e.g., based on) the initialization parameter, determining at least one scaling parameter based at least on the second sidelink identifier, and scaling the sequence with the at least one scaling parameter to generate the DMRS.

In some examples, generating the DMRS may include determining an initialization parameter based at least on the first sidelink identifier, initializing a sequence generator with the initialization parameter, generating a pseudo-random sequence using the sequence generator, generating a first sequence from the pseudo-random sequence, determining a frequency-domain orthogonal cover code (OCC) based at least on the second sidelink identifier, and applying the frequency-domain OCC to the first sequence to generate the DMRS.

At block 1408, the first sidelink device may transmit the DMRS to a second sidelink device. For example, the DMRS generation circuitry 1243 together with the communication and processing circuitry 1241 and the transceiver 1210, shown and described above in connection with FIG. 12, may transmit the DMRS on a designated resource as described above, for example, in conjunction with FIGS. 5A and 5B.

In some examples, the method 1400 may further include determining a physical layer sidelink synchronization identifier for the first sidelink device based on the first sidelink identifier and the second sidelink identifier.

Figure 15:
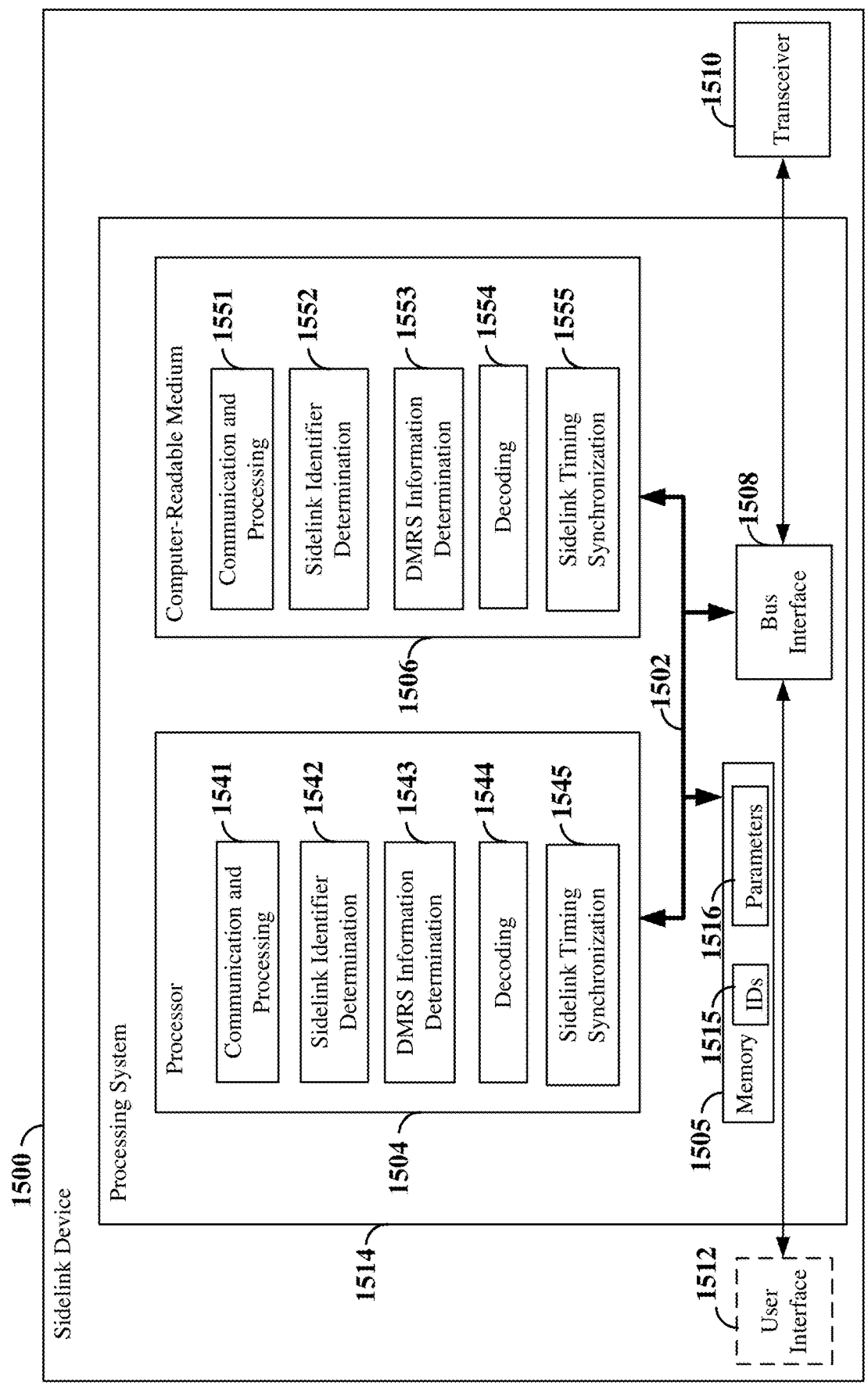
FIG. 15 is a diagram illustrating an example of a hardware implementation for a sidelink device employing a processing system according to some aspects.

FIG. 15 is a block diagram illustrating an example of a hardware implementation for a sidelink device 1500 employing a processing system 1514. For example, the sidelink device 1500 may correspond to any of the sidelink devices, UEs, or scheduled entities shown in any of FIGS. 1, 2, 3, 7, and 12.

The sidelink device 1500 may be implemented with a processing system 1514 that includes one or more processors 1504. Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the sidelink device 1500 may be configured to perform any one or more of the functions described herein. That is, the processor 1504, as utilized in the sidelink device 1500, may be used to implement any one or more of the processes and procedures described below.

In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 links together various circuits including one or more processors (represented generally by the processor 1504), a memory 1505, and computer-readable media (represented generally by the computer-readable medium 1506). The memory 1505 may store IDs 1515 (e.g., sidelink device identifiers) and parameters 1516 (e.g., initialization and scaling parameters) used by the processor 1504 for generating a sequence. The bus 1502 may also link various other circuits such as timing sources, peripherals, voltage regulators, and power management circuits, which are well known in the art, and therefore, will not be described any further.

A bus interface 1508 provides an interface between the bus 1502 and a transceiver 1510. The transceiver 1510 provides a means for communicating with various other apparatus over a transmission medium (e.g., air interface). Depending upon the nature of the apparatus, a user interface 1512 (e.g., keypad, display, touch screen, speaker, microphone, control knobs, etc.) may also be provided. Of course, such a user interface 1512 is optional, and may be omitted in some examples.

The processor 1504 is responsible for managing the bus 1502 and general processing, including the execution of software stored on the computer-readable medium 1506. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 1504, causes the processing system 1514 to perform the various functions described below for any particular apparatus. The computer-readable medium 1506 and the memory 1505 may also be used for storing data that is manipulated by the processor 1504 when executing software.

The computer-readable medium 1506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1506 may reside in the processing system 1514, external to the processing system 1514, or distributed across multiple entities including the processing system 1514. The computer-readable medium 1506 may be embodied in a computer program product. By way of example, a computer program product may include a computer-readable medium in packaging materials. In some examples, the computer-readable medium 1506 may be part of the memory 1505. Those skilled in the art will recognize how best to implement the described functionality presented throughout this disclosure depending on the particular application and the overall design constraints imposed on the overall system.

In some aspects of the disclosure, the processor 1504 may include circuitry configured for various functions. For example, the processor 1504 may include communication and processing circuitry 1541 configured to communicate over a sidelink carrier to exchange sidelink control information and sidelink data with other sidelink devices. In some examples, the communication and processing circuitry 1541 may be configured to transmit a PSCCH, which may include a sidelink synchronization signal block (S-SSB), other control information, and/or pilot signals, and/or a PSSCH, which may include sidelink data, within a radio frame based on sidelink transmission timing. In some examples, the sidelink transmission timing may be determined based on synchronization to a synchronization source (e.g., gNB, eNB, GNSS, etc.), self-synchronization to an internal timing/frequency reference, or synchronization to another sidelink device (e.g., based on a received S-SS as described herein). The communication and processing circuitry 1541 may further be configured to execute communication and processing software 1551 stored on the computer-readable medium 1506 to implement one or more functions described herein.

In some implementations where the communication involves receiving information, the communication and processing circuitry 1541 may obtain information from a component of the sidelink device 1500 (e.g., from the transceiver 1510 that receives the information via radio frequency signaling or some other type of signaling suitable for the applicable communication medium), process (e.g., decode) the information, and output the processed information. For example, the communication and processing circuitry 1541 may output the information to another component of the processor 1504, to the memory 1505, or to the bus interface 1508. In some examples, the communication and processing circuitry 1541 may receive one or more of signals, messages, other information, or any combination thereof. In some examples, the communication and processing circuitry 1541 may receive information via one or more channels. In some examples, the communication and processing circuitry 1541 may include functionality for a means for receiving. In some examples, the communication and processing circuitry 1541 may include functionality for a means for decoding.

In some implementations where the communication involves sending (e.g., transmitting) information, the communication and processing circuitry 1541 may obtain information (e.g., from another component of the processor 1504, the memory 1505, or the bus interface 1508), process (e.g., encode) the information, and output the processed information. For example, the communication and processing circuitry 1541 may output the information to the transceiver 1510 (e.g., that transmits the information via radio frequency signaling or some other type of signaling suitable for the applicable communication medium). In some examples, the communication and processing circuitry 1541 may send one or more of signals, messages, other information, or any combination thereof. In some examples, the communication and processing circuitry 1541 may send information via one or more channels. In some examples, the communication and processing circuitry 1541 may include functionality for a means for sending (e.g., a means for transmitting). In some examples, the communication and processing circuitry 1541 may include functionality for a means for encoding.

The processor 1504 may include sidelink identifier determination circuitry 1542 configured to perform sidelink identifier determination-related operations as discussed herein (e.g., one or more of the operations described in conjunction with FIGS. 8-11). In some examples, the sidelink identifier determination circuitry 1542 may include functionality for a means for determining a sidelink identifier. In some examples, the sidelink identifier determination circuitry 1542 may include functionality for a means for deriving a sidelink identifier. For example, the sidelink identifier determination circuitry 1542 may be determine an identifier associated with a received synchronization signal when decoding the synchronization signal. In some examples, the sidelink identifier determination circuitry 1542 may include functionality for a means for determining a physical layer sidelink synchronization identifier based on a first sidelink identifier and a second sidelink identifier for another sidelink device. For example, the sidelink identifier determination circuitry 1542 may calculate a physical layer identifier based on the $N_{ID,1}^{SL}$ ID and the $N_{ID,2}^{SL}$ ID of the second sidelink device. In some examples, the sidelink identifier determination circuitry 1542 may further be configured to execute sidelink identifier determination software 1552 included on the computer-readable medium 1506 to implement one or more functions described herein.

The sidelink identifier determination circuitry 1542 correspond to the sidelink identifier determining circuitry 1102 shown in FIG. 11. In some examples, the sidelink identifier determination circuitry 1542 may be configured to derive a first sidelink identifier and a second sidelink identifier for a sidelink device from S-PSS and S-SSS. In some examples, the sidelink identifier determination circuitry 1542 may be configured to determine a first sidelink identifier and/or a second sidelink identifier for a sidelink device. For example, the sidelink identifier determination circuitry 1542 may determine $N_{ID,1}^{SL}$ and $N_{ID,2}^{SL}$.

The processor 1504 may include DMRS information determination circuitry 1543 configured to perform DMRS information determination-related operations as discussed herein (e.g., one or more of the operations described in conjunction with FIGS. 8-11). In some examples, the DMRS information determination circuitry 1543 may include functionality for a means for determining an initialization parameter. In some examples, the DMRS information determination circuitry 1543 may include functionality for a means for determining a scaling parameter. In some examples, the DMRS information determination circuitry 1543 may include functionality for a means for determining DMRS information. In some examples, the DMRS information determination circuitry 1543 may further be configured to execute DMRS information determination software 1553 included on the computer-readable medium 1506 to implement one or more functions described herein.

In some examples, the DMRS information determination circuitry 1543 may correspond to the DMRS information determining circuitry 1104 described above in conjunction with FIG. 11. In some examples, the DMRS information determination circuitry 1543 may be configured to determine DMRS information based on a first sidelink identifier and a second sidelink identifier.

The processor 1504 may include decoding circuitry 1544 configured to perform decoding-related operations as discussed herein (e.g., one or more of the operations described in conjunction with FIGS. 8-11). In some examples, the decoding circuitry 1544 may include functionality for a means for decoding a signal. In some examples, the decoding circuitry 1544 may further be configured to execute decoding software 1554 included on the computer-readable medium 1506 to implement one or more functions described herein.

The decoding circuitry 1544 may correspond to the decoding circuitry 1106 described above in conjunction with FIG. 11. In some examples, the decoding circuitry 1544 may be configured to decode a received broadcast signals based on DMRS information.

The processor 1504 may include sidelink timing synchronization circuitry 1545 configured to perform sidelink synchronization-related operations as discussed herein (e.g., one or more of the operations described in conjunction with FIGS. 8-11). In some examples, the sidelink timing synchronization circuitry 1545 may include functionality for a means for synchronizing with a sidelink device. In some examples, the sidelink timing synchronization circuitry 1545 may further be configured to execute sidelink timing synchronization software 1555 included on the computer-readable medium 1506 to implement one or more functions described herein.

The sidelink timing synchronization circuitry 1545 may correspond to the synchronizing circuitry 1108 described above in conjunction with FIG. 11. In some examples, the sidelink timing synchronization circuitry 1545 may be configured to synchronize with a sidelink device based on broadcast channel information.

Figure 16:
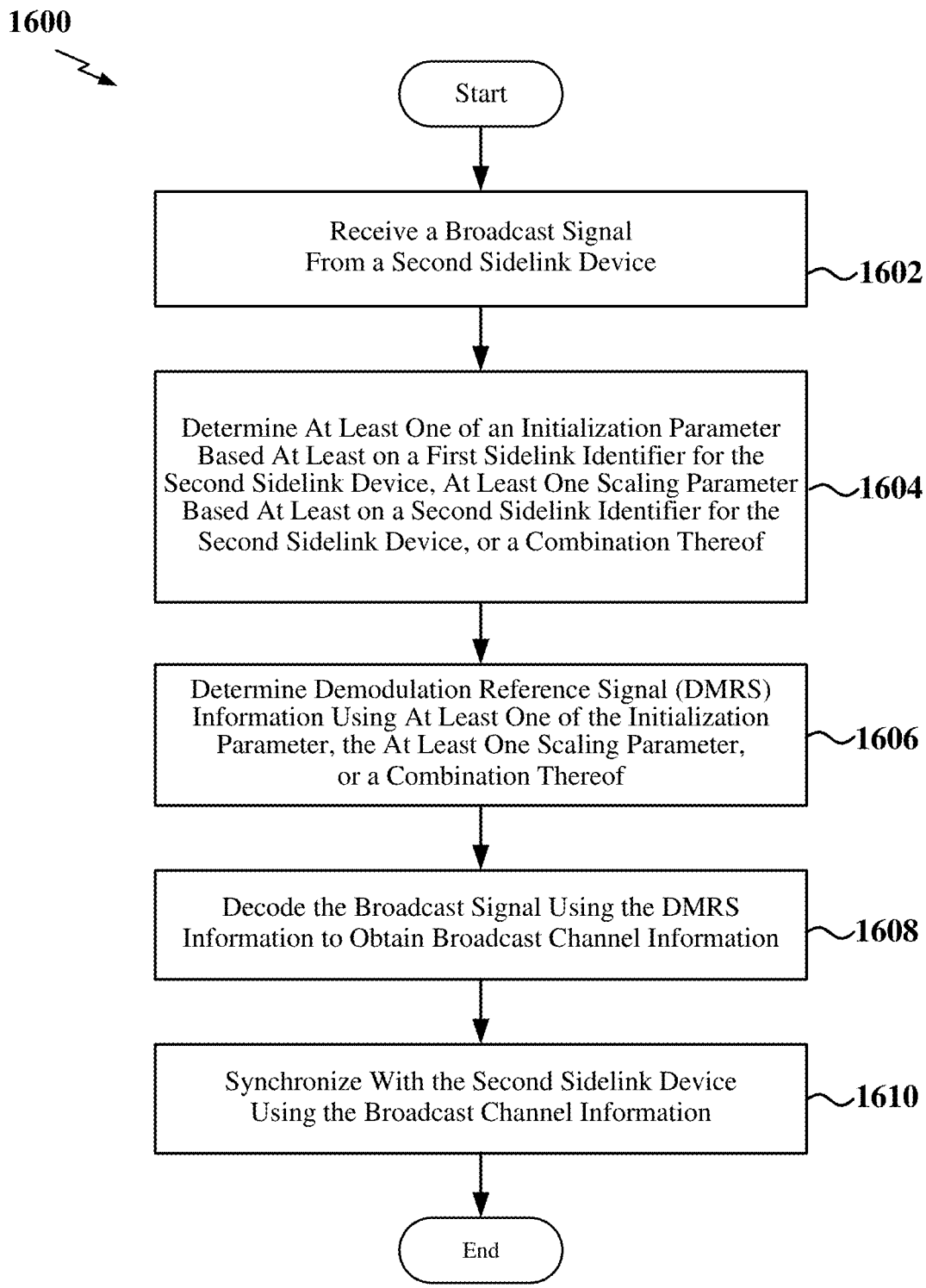
FIG. 16 is a flow chart illustrating an example of a synchronization method for wireless communication over a sidelink carrier according to some aspects.

FIG. 16 is a flow chart of a method 1600 for wireless communication over a sidelink carrier. As described below, some or all illustrated features may be omitted in a particular implementation within the scope of the present disclosure, and some illustrated features may not be required for implementation of all examples. In some examples, the method may be performed by the sidelink device 1500, as described above and illustrated in FIG. 15, by a processor or processing system, or by any suitable means for carrying out the described functions.

At block 1602, a first sidelink device may receive a broadcast signal from a second sidelink device. For example, the communication and processing circuitry 1541 and the transceiver 1510, shown and described above in connection with FIG. 15, may monitor a designated resource (e.g., PSSCH) for signals broadcast by any nearby sidelink devices.

At block 1604, the first sidelink device may determine at least one of an initialization parameter based at least on a first sidelink identifier for the second sidelink device, at least one scaling parameter based at least on a second sidelink identifier for the second sidelink device, or a combination thereof. For example, the DMRS information determination circuitry 1543, shown and described above in connection with FIG. 15, may calculate $c_{init}$ based on $N_{ID,1}^{SL}$ as discussed herein. As another example, the DMRS information determination circuitry 1543 may calculate a scaling parameter based on $N_{ID,2}^{SL}$ as discussed herein.

In some examples, the first sidelink identifier is a first value of a set of values from 0 to N. In some examples, the second sidelink identifier is a 0 or a 1.

At block 1606, the first sidelink device may determine demodulation reference signal (DMRS) information using at least one of the initialization parameter, the at least one scaling parameter, or a combination thereof. For example, the DMRS information determination circuitry 1543 may generate a sequence based on $c_{init}$ and/or the scaling parameter and then generate a DMRS based on the sequence.

In some examples, determining the DMRS information may include determining the initialization parameter based at least on the first sidelink identifier and determining the DMRS information may include using the initialization parameter to generate the DMRS information.

In some examples, determining the DMRS information may include determining the initialization parameter based at least on the first sidelink identifier, initializing a sequence generator with the initialization parameter, generating a pseudo-random sequence using the sequence generator, and generating the DMRS information from the pseudo-random sequence.

In some examples, determining the DMRS information may include generating a sequence, determining the at least one scaling parameter based at least on the second sidelink identifier, and scaling the sequence with the at least one scaling parameter to generate the DMRS information.

In some examples, determining the DMRS information may include generating a sequence, determining a frequency-domain cover code based at least on the second sidelink identifier, and applying the frequency-domain cover code to the sequence to generate the DMRS information. In some examples, the cover code is an orthogonal cover code.

In some examples, determining the DMRS information may include determining the initialization parameter based at least on the first sidelink identifier, generating a sequence using the initialization parameter, determining the at least one scaling parameter based at least on the second sidelink identifier, and scaling the sequence with the at least one scaling parameter to generate the DMRS information.

In some examples, determining the DMRS information may include determining the initialization parameter based at least on the first sidelink identifier, initializing a sequence generator with the initialization parameter, generating a pseudo-random sequence using the sequence generator, generating a first sequence from the pseudo-random sequence, determining a frequency-domain orthogonal cover code (OCC) based at least on the second sidelink identifier, and applying the frequency-domain OCC to the first sequence to generate the DMRS information.

At block 1608, the first sidelink device may decode the broadcast signal using (e.g., based on) the DMRS information to obtain broadcast channel information. For example, the decoding circuitry 1544 together with the communication and processing circuitry 1541 and the transceiver 1510, shown and described above in connection with FIG. 15, may receive a broadcast signal and perform a decoding operation on the broadcast signal using the DMRS information as an input to the decoding operation.

At block 1610, the first sidelink device may synchronize with the second sidelink device using (e.g., based on) the broadcast channel information. For example, the sidelink timing synchronization circuitry 1545, shown and described above in connection with FIG. 15, may adjust the timing used to communicate with the second sidelink device according to timing of the broadcast information.

In some examples, the method 1600 may further include receiving a primary synchronization signal and a secondary synchronization signal from the second sidelink device. In some examples, determining the first sidelink identifier may include deriving the first sidelink identifier from the secondary synchronization signal. In some examples, determining the second sidelink identifier may include deriving the second sidelink identifier from the primary synchronization signal.

In some examples, the method 1600 may further include determining a physical layer sidelink synchronization identifier for the second sidelink device based on the first sidelink identifier and the second sidelink identifier. In some examples, the method 1600 may further include communicating with the second sidelink device using the physical layer sidelink synchronization identifier.

Figure 17:
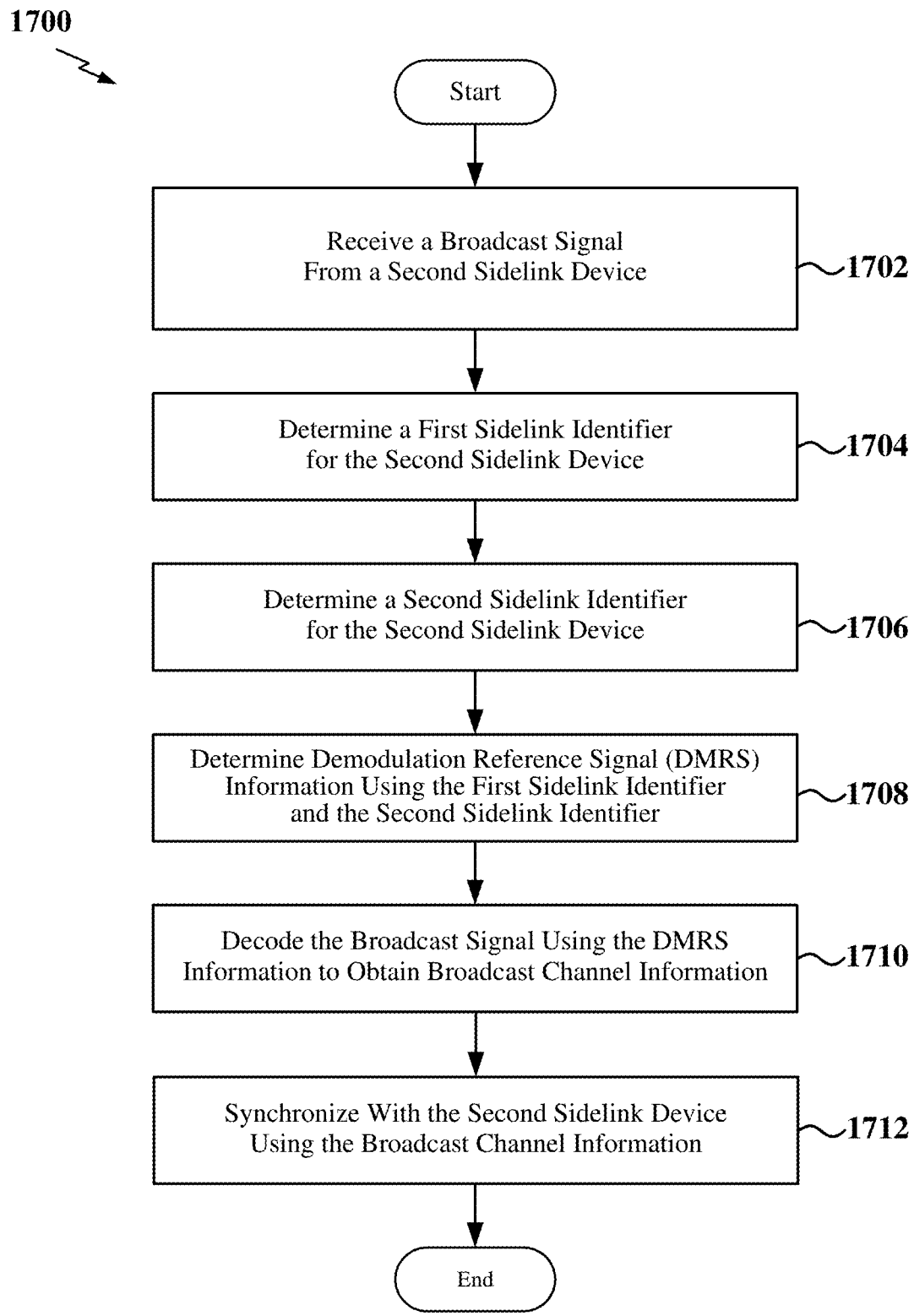
FIG. 17 is a flow chart illustrating an example of a synchronization method for wireless communication over a sidelink carrier according to some aspects.

FIG. 17 is a flow chart of a method 1700 for wireless communication over a sidelink carrier. As described below, some or all illustrated features may be omitted in a particular implementation within the scope of the present disclosure, and some illustrated features may not be required for implementation of all examples. In some examples, the method may be performed by the sidelink device 1500, as described above and illustrated in FIG. 15, by a processor or processing system, or by any suitable means for carrying out the described functions.

At block 1702, a first sidelink device may receive a broadcast signal from a second sidelink device. For example, the communication and processing circuitry 1541 and the transceiver 1510, shown and described above in connection with FIG. 15, may monitor a designated resource (e.g., PSSCH) for signals broadcast by any nearby sidelink devices.

At block 1704, the first sidelink device may determine a first sidelink identifier for the second sidelink device. In some examples, the first sidelink identifier is a first value of a set of values from 0 to N. For example, the sidelink identifier determination circuitry 1542, shown and described above in connection with FIG. 15, may process a received synchronization signal to determine the $N_{ID,1}^{SL}$ ID associated with the signal.

At block 1706, the first sidelink device may determine a second sidelink identifier for the second sidelink device. In some examples, the second sidelink identifier is a 0 or a 1. For example, the sidelink identifier determination circuitry 1542, shown and described above in connection with FIG. 15, may process a received synchronization signal to determine the $N_{ID,2}^{SL}$ ID associated with the signal.

At block 1708, the first sidelink device may determine demodulation reference signal (DMRS) information using (e.g., based on) the first sidelink identifier and the second sidelink identifier. For example, the DMRS information determination circuitry 1543, shown and described above in connection with FIG. 15, may calculate $c_{init}$ based on $N_{ID,1}^{SL}$ and calculate a scaling parameter based on $N_{ID,2}^{SL}$ as discussed herein. The DMRS information determination circuitry 1543 may then generate a sequence based on these values and generate a DMRS based on the sequence.

In some examples, determining the DMRS information may include determining an initialization parameter based at least on the first sidelink identifier and using the initialization parameter to generate the DMRS information.

In some examples, determining the DMRS information may include determining an initialization parameter based at least on the first sidelink identifier, initializing a sequence generator with the initialization parameter, generating a pseudo-random sequence using the sequence generator, and generating the DMRS information from the pseudo-random sequence.

In some examples, determining the DMRS information may include generating a sequence, determining at least one scaling parameter based at least on the second sidelink identifier, and scaling the sequence with the at least one scaling parameter to generate the DMRS information.

In some examples, determining the DMRS information may include generating a sequence, determining a frequency-domain cover code based at least on the second sidelink identifier, and applying the frequency-domain cover code to the sequence to generate the DMRS information. In some examples, the cover code may be an orthogonal cover code.

In some examples, determining the DMRS information may include determining an initialization parameter based at least on the first sidelink identifier, generating a sequence using (e.g., based on) the initialization parameter, determining at least one scaling parameter based at least on the second sidelink identifier, and scaling the sequence with the at least one scaling parameter to generate the DMRS information.

In some examples, determining the DMRS information may include determining an initialization parameter based at least on the first sidelink identifier, initializing a sequence generator with the initialization parameter, generating a pseudo-random sequence using the sequence generator, generating a first sequence from the pseudo-random sequence, determining a frequency-domain orthogonal cover code (OCC) based at least on the second sidelink identifier, and applying the frequency-domain OCC to the first sequence to generate the DMRS information.

At block 1710, the first sidelink device may decode the broadcast signal using (e.g., based on) the DMRS information to obtain broadcast channel information. For example, the decoding circuitry 1544 together with the communication and processing circuitry 1541 and the transceiver 1510, shown and described above in connection with FIG. 15, may receive a broadcast signal and perform a decoding operation on the broadcast signal using the DMRS information as an input to the decoding operation.

At block 1712, the first sidelink device may synchronize with the second sidelink device using (e.g., based on) the broadcast channel information. For example, the sidelink timing synchronization circuitry 1545, shown and described above in connection with FIG. 15, may adjust the timing used to communicate with the second sidelink device according to timing of the broadcast information.

In some examples, the method 1700 may further include receiving a primary synchronization signal and a secondary synchronization signal from the second sidelink device. In some examples, determining the first sidelink identifier may include deriving the first sidelink identifier from the secondary synchronization signal. In some examples, determining the second sidelink identifier may include deriving the second sidelink identifier from the primary synchronization signal.

Figure 18:
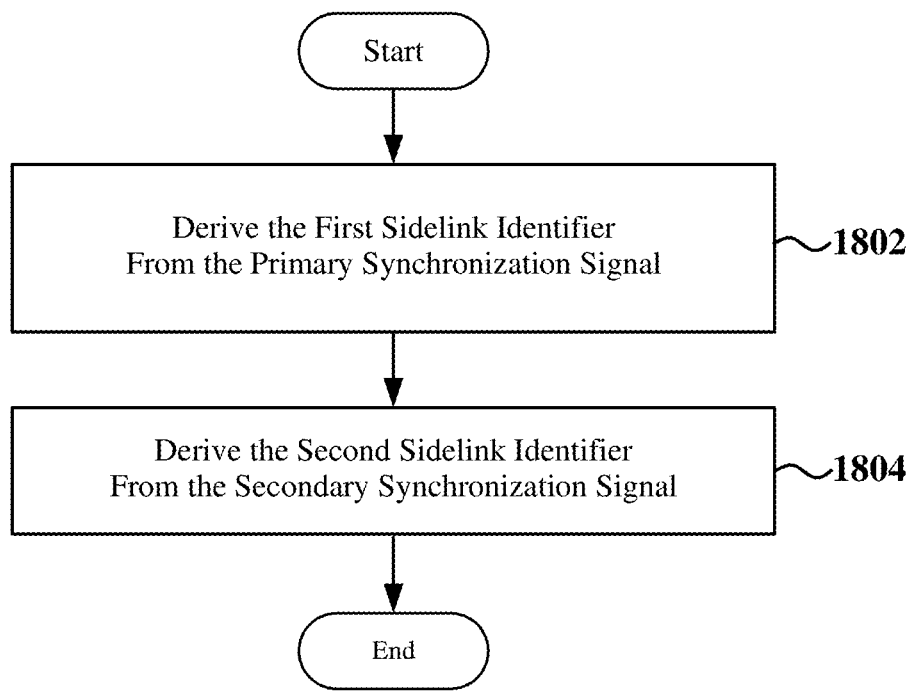
FIG. 18 is a flow chart illustrating an example of a method for deriving sidelink identifiers according to some aspects.

FIG. 18 is a flow chart of a method 1800 for wireless communication over a sidelink carrier. As described below, some or all illustrated features may be omitted in a particular implementation within the scope of the present disclosure, and some illustrated features may not be required for implementation of all examples. In some examples, the method may be performed by the sidelink device 1500, as described above and illustrated in FIG. 15, by a processor or processing system, or by any suitable means for carrying out the described functions.

At block 1802, a sidelink device may derive the first sidelink identifier from the primary synchronization signal. For example, the sidelink identifier determination circuitry 1542, shown and described above in connection with FIG. 15, may process a received synchronization signal to determine the $N_{ID,1}^{SL}$ ID associated with the signal.

At block 1804, the sidelink device may derive the second sidelink identifier from the secondary synchronization signal. For example, the sidelink identifier determination circuitry 1542, shown and described above in connection with FIG. 15, may process a received synchronization signal to determine the $N_{ID,2}^{SL}$ ID associated with the signal.

Figure 19:
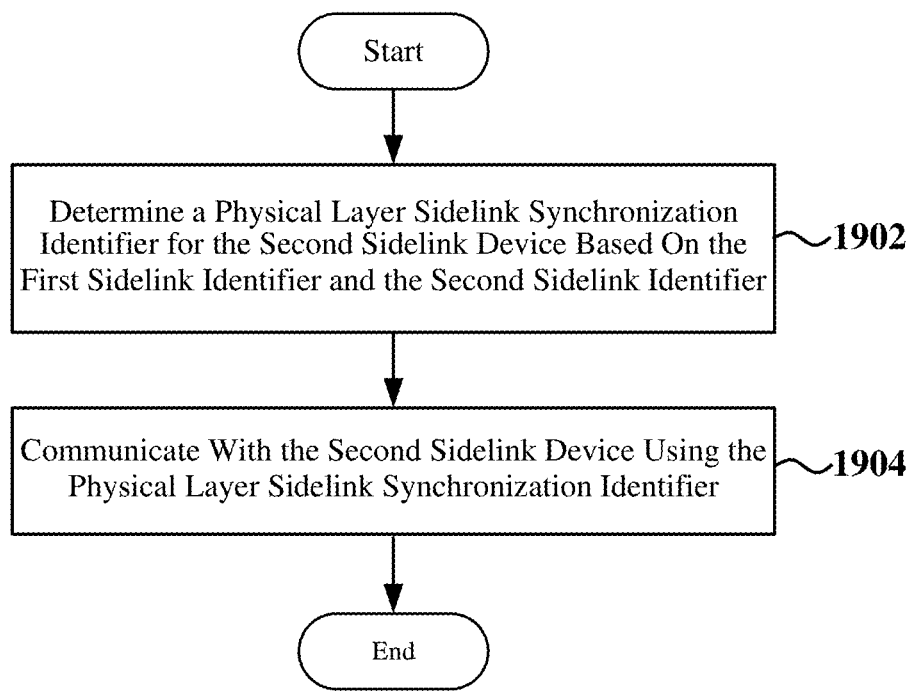
FIG. 19 is a flow chart illustrating an example of a method for wireless communication over a sidelink carrier according to some aspects.

FIG. 19 is a flow chart of a method 1900 for wireless communication over a sidelink carrier. As described below, some or all illustrated features may be omitted in a particular implementation within the scope of the present disclosure, and some illustrated features may not be required for implementation of all examples. In some examples, the method may be performed by the sidelink device 1500, as described above and illustrated in FIG. 15, by a processor or processing system, or by any suitable means for carrying out the described functions.

At block 1902, a first sidelink device may determine a physical layer sidelink synchronization identifier for the second sidelink device based on the first sidelink identifier and the second sidelink identifier. For example, the sidelink identifier determination circuitry 1542, shown and described above in connection with FIG. 15, may calculate a physical layer identifier based on the $N_{ID,1}^{SL}$ ID and the $N_{ID,2}^{SL}$ ID of the second sidelink device.

At block 1904, the first sidelink device may communicate with the second sidelink device using (e.g., based on) the physical layer sidelink synchronization identifier. For example, the communication and processing circuitry 1541 and the transceiver 1510, shown and described above in connection with FIG. 15, may, based on the physical layer identifier, encode signal transmitted to the second sidelink device and/or decode signals received from the second sidelink device.

The following provides an overview of several aspects of the present disclosure.

Aspect 1: A method for wireless communication at first sidelink device, the method comprising: determining at least one of an initialization parameter based at least on a first sidelink identifier for the first sidelink device, at least one scaling parameter based at least on a second sidelink identifier for the first sidelink device, or a combination thereof; generating a demodulation reference signal (DMRS) using at least one of the initialization parameter, the at least one scaling parameter, or a combination thereof; and transmitting the DMRS to a second sidelink device.

Aspect 2: The method of aspect 1, wherein generating the DMRS comprises: initializing a sequence generator with the initialization parameter; generating a pseudo-random sequence using the sequence generator; and generating the DMRS from the pseudo-random sequence.

Aspect 3: The method of aspect 2, wherein determining the initialization parameter is further based on a configured value, a pre-configured value, or a defined value.

Aspect 4: The method of any of aspects 1 through 3, wherein generating the DMRS comprises: generating a sequence; and scaling the sequence with the at least one scaling parameter to generate the DMRS.

Aspect 5: The method of aspect 4, wherein the at least one scaling parameter comprises a frequency-domain cover code.

Aspect 6: The method of aspect 5, wherein the cover code is an orthogonal cover code.

Aspect 7: The method of any of aspects 4 through 6, wherein generating the DMRS comprises: determining a parameter for a sequence generator; initializing the sequence generator with the parameter; generating a pseudo-random sequence using the sequence generator; and generating the DMRS from the pseudo-random sequence.

Aspect 8: The method of any of aspects 4 through 7, wherein generating the DMRS comprises: receiving a parameter for a sequence generator via a radio resource control (RRC) message; initializing the sequence generator with the parameter; generating a pseudo-random sequence using the sequence generator; and generating the DMRS from the pseudo-random sequence.

Aspect 9: The method of any of aspects 1 through 8, wherein generating the DMRS comprises: initializing a sequence generator with the initialization parameter; generating a pseudo-random sequence using the sequence generator; generating a first sequence from the pseudo-random sequence; determining a frequency-domain orthogonal cover code (OCC) based at least on the second sidelink identifier; and applying the frequency-domain OCC to the first sequence to generate the DMRS.

Aspect 10: The method of any of aspects 1 through 9, further comprising: determining a physical layer sidelink synchronization identifier for the first sidelink device based on the first sidelink identifier and the second sidelink identifier.

Aspect 11: The method of any of aspects 1 through 10, wherein: the first sidelink identifier is a first value of a set of values from 0 to N; and the second sidelink identifier is a 0 or a 1.

Aspect 13: The method of any of aspects 1 through 12, further comprising: initializing a sequence generator with the initialization parameter; generating a pseudo-random sequence using the sequence generator; and generating the DMRS from the pseudo-random sequence.

Aspect 14: The method of any of aspects 1 through 13, further comprising determining the initialization parameter based on a configured value, a pre-configured value, or a defined value.

Aspect 15: The method of any of aspects 1 through 14, further comprising: generating a sequence; and scaling the sequence with the at least one scaling parameter to generate the DMRS.

Aspect 16: A method for wireless communication at first sidelink device, the method comprising: receiving a broadcast signal from a second sidelink device; determining at least one of an initialization parameter based at least on a first sidelink identifier for the second sidelink device, at least one scaling parameter based at least on a second sidelink identifier for the second sidelink device, or a combination thereof; determining demodulation reference signal (DMRS) information using at least one of the initialization parameter, the at least one scaling parameter, or a combination thereof; decoding the broadcast signal using the DMRS information to obtain broadcast channel information; and synchronizing with the second sidelink device using the broadcast channel information.

Aspect 17: The method of aspect 16, further comprising receiving a primary synchronization signal and a secondary synchronization signal from the second sidelink device, wherein: determining the first sidelink identifier comprises deriving the first sidelink identifier from the secondary synchronization signal; and determining the second sidelink identifier comprises deriving the second sidelink identifier from the primary synchronization signal.

Aspect 18: The method of any of aspects 16 through 17, wherein determining the DMRS information comprises: determining the initialization parameter based at least on the first sidelink identifier; and using the initialization parameter to generate the DMRS information.

Aspect 19: The method of any of aspects 16 through 18, wherein determining the DMRS information comprises: determining the initialization parameter based at least on the first sidelink identifier; initializing a sequence generator with the initialization parameter; generating a pseudo-random sequence using the sequence generator; and generating the DMRS information from the pseudo-random sequence.

Aspect 20: The method of any of aspects 16 through 19, wherein determining the DMRS information comprises: generating a sequence; determining the at least one scaling parameter based at least on the second sidelink identifier; and scaling the sequence with the at least one scaling parameter to generate the DMRS information.

Aspect 21: The method of any of aspects 16 through 20, wherein determining the DMRS information comprises: generating a sequence; determining a frequency-domain cover code based at least on the second sidelink identifier; and applying the frequency-domain cover code to the sequence to generate the DMRS information.

Aspect 22: The method of aspect 21, wherein the cover code is an orthogonal cover code.

Aspect 23: The method of any of aspects 16 through 22, wherein determining the DMRS information comprises: determining the initialization parameter based at least on the first sidelink identifier; generating a sequence using the initialization parameter; determining the at least one scaling parameter based at least on the second sidelink identifier; and scaling the sequence with the at least one scaling parameter to generate the DMRS information.

Aspect 24: The method of any of aspects 16 through 23, wherein determining the DMRS information comprises: determining the initialization parameter based at least on the first sidelink identifier; initializing a sequence generator with the initialization parameter; generating a pseudo-random sequence using the sequence generator; generating a first sequence from the pseudo-random sequence; determining a frequency-domain orthogonal cover code (OCC) based at least on the second sidelink identifier; and applying the frequency-domain OCC to the first sequence to generate the DMRS information.

Aspect 25: The method of any of aspects 16 through 24, further comprising: determining a physical layer sidelink synchronization identifier for the second sidelink device based on the first sidelink identifier and the second sidelink identifier; and communicating with the second sidelink device using the physical layer sidelink synchronization identifier.

Aspect 26: The method of any of aspects 16 through 25, wherein: the first sidelink identifier is a first value of a set of values from 0 to N; and the second sidelink identifier is a 0 or a 1.

Aspect 29: The method of any of aspects 16 through 28, further comprising: determining the initialization parameter based at least on the first sidelink identifier; and using the initialization parameter to generate the DMRS information.

Aspect 30: The method of any of aspects 16 through 29, further comprising: determining the initialization parameter based at least on the first sidelink identifier; initializing a sequence generator with the initialization parameter; generating a pseudo-random sequence using the sequence generator; and generating the DMRS information from the pseudo-random sequence.

Aspect 31: A sidelink device comprising: a transceiver configured to communicate with a radio access network, a memory, and a processor communicatively coupled to the transceiver and the memory, wherein the processor and the memory are configured to perform any one of aspects 1 through 15.

Aspect 32: An apparatus configured for wireless communication comprising at least one means for performing any one of aspects 1 through 15.

Aspect 33: A non-transitory computer-readable medium storing computer-executable code, comprising code for causing an apparatus to perform any one of aspects 1 through 15.

Aspect 34: A sidelink device comprising: a transceiver configured to communicate with a radio access network, a memory, and a processor communicatively coupled to the transceiver and the memory, wherein the processor and the memory are configured to perform any one of aspects 16 through 30.

Aspect 35: An apparatus configured for wireless communication comprising at least one means for performing any one of aspects 16 through 30.

Aspect 36: A non-transitory computer-readable medium storing computer-executable code, comprising code for causing an apparatus to perform any one of aspects 16 through 30.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-19 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in any of FIG. 1, 2, 6, 8-12, or 15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a first sidelink device, the method comprising:
   transmitting a sidelink secondary synchronization sequence based on a first sidelink identifier for the first sidelink device;
   transmitting a sidelink primary synchronization sequence based on a second sidelink identifier for the first sidelink device;
   determining an initialization parameter based on the first sidelink identifier for the first sidelink device;
   determining parameter based on the second sidelink identifier for the first sidelink device;
   generating a demodulation reference signal (DMRS) based on the initialization parameter and the at least one scaling parameter; and
   transmitting the DMRS to a second sidelink device.

2. The method of claim 1, wherein generating the DMRS comprises:
   initializing a sequence generator with the initialization parameter;
   generating a pseudo-random sequence using the sequence generator; and
   generating the DMRS from the pseudo-random sequence.

3. The method of claim 2, wherein determining the initialization parameter is further based on a configured value, a pre-configured value, or a defined value.

4. The method of claim 1, wherein generating the DMRS comprises:
   generating a sequence; and
   scaling the sequence with the at least one scaling parameter to generate the DMRS.

5. The method of claim 4, wherein the at least one scaling parameter comprises a frequency-domain cover code.

6. The method of claim 5, wherein the frequency-domain cover code is an orthogonal cover code.

7. The method of claim 4, wherein generating the DMRS comprises:
   initializing a sequence generator with the initialization parameter;
   generating a pseudo-random sequence using the sequence generator; and
   generating the DMRS from the pseudo-random sequence.

8. The method of claim 4, wherein determining the initialization parameter comprises receiving the initialization parameter via a radio resource control (RRC) message and generating the DMRS comprises:
   initializing a sequence generator with the initialization parameter;
   generating a pseudo-random sequence using the sequence generator; and
   generating the DMRS from the pseudo-random sequence.

9. The method of claim 1, wherein the at least one scaling parameter comprises a frequency-domain orthogonal cover code (OCC) and generating the DMRS comprises:
   initializing a sequence generator with the initialization parameter;
   generating a pseudo-random sequence using the sequence generator;
   generating a first sequence from the pseudo-random sequence; and
   applying the frequency-domain OCC to the first sequence to generate the DMRS.

10. The method of claim 1, further comprising:
    determining a physical layer sidelink synchronization identifier for the first sidelink device based on the first sidelink identifier and the second sidelink identifier.

11. The method of claim 1, wherein:
    the first sidelink identifier is a first value of a set of values from 0 to N; and
    the second sidelink identifier is a 0 or a 1.

12. A first sidelink device, comprising:
    a transceiver;
    a memory; and
    a processor communicatively coupled to the transceiver and the memory, wherein the processor and the memory are configured to:
       transmit a sidelink secondary synchronization sequence based on a first sidelink identifier for the first sidelink device;
       transmit a sidelink primary synchronization sequence based on a second sidelink identifier for the first sidelink device;
       determine an initialization parameter based on the first sidelink identifier for the first sidelink device;
       determine at least one scaling parameter based on the second sidelink identifier for the first sidelink device;
       generate a demodulation reference signal (DMRS) based on the initialization parameter and the at least one scaling parameter; and
       transmit the DMRS to a second sidelink device.

13. The first sidelink device of claim 12, wherein the processor and the memory are further configured to:
    initialize a sequence generator with the initialization parameter;
    generate a pseudo-random sequence using the sequence generator; and
    generate the DMRS from the pseudo-random sequence.

14. The first sidelink device of claim 13, wherein the processor and the memory are further configured to:
    determine the initialization parameter based on a configured value, a pre-configured value, or a defined value.

15. The first sidelink device of claim 12, wherein the processor and the memory are further configured to:
    generate a sequence; and
    scale the sequence with the at least one scaling parameter to generate the DMRS.

16. The first sidelink device of claim 15, wherein the at least one scaling parameter comprises a frequency-domain cover code.

17. The first sidelink device of claim 16, wherein the frequency-domain cover code is an orthogonal cover code.

18. The first sidelink device of claim 12, wherein the processor and the memory are further configured to:
    initialize a sequence generator with the initialization parameter;
    generate a pseudo-random sequence using the sequence generator; and
    generate the DMRS from the pseudo-random sequence.

19. The first sidelink device of claim 12, wherein the processor and the memory are further configured to:
    receive the initialization parameter via a radio resource control (RRC) message;
    initialize a sequence generator with the initialization parameter;
    generate a pseudo-random sequence using the sequence generator; and
    generate the DMRS from the pseudo-random sequence.

20. The first sidelink device of claim 12, wherein the at least one scaling parameter comprises a frequency-domain orthogonal cover code (OCC) and the processor and the memory are further configured to:
    initialize a sequence generator with the initialization parameter;

generate a pseudo-random sequence using the sequence generator;
generate a first sequence from the pseudo-random sequence; and
apply the frequency-domain OCC to the first sequence to generate the DMRS.

21. The first sidelink device of claim 12, wherein the processor and the memory are further configured to:
determine a physical layer sidelink synchronization identifier for the first sidelink device based on the first sidelink identifier and the second sidelink identifier.

22. The first sidelink device of claim 12, wherein:
the first sidelink identifier is a first value of a set of values from 0 to N; and
the second sidelink identifier is a 0 or a 1.

23. A first sidelink device, comprising:
means for transmitting a sidelink secondary synchronization sequence based on a first sidelink identifier for the first sidelink device;
means for transmitting a sidelink primary synchronization sequence based on a second sidelink identifier for the first sidelink device;
means for determining an initialization parameter based on the first sidelink identifier for the first sidelink device;
means for determining at least one scaling parameter based on the second sidelink identifier for the first sidelink device;
means for generating a demodulation reference signal (DMRS) based on the initialization parameter and the at least one scaling parameter; and
means for transmitting the DMRS to a second sidelink device.

24. The first sidelink device of claim 23, wherein the means for generating the DMRS comprises:
means for initializing a sequence generator with the initialization parameter;
means for generating a pseudo-random sequence using the sequence generator; and
means for generating the DMRS from the pseudo-random sequence.

25. The first sidelink device of claim 24, wherein determining the initialization parameter is further based on a configured value, a pre-configured value, or a defined value.

26. The first sidelink device of claim 23, wherein the means for generating the DMRS comprises:
means for generating a sequence; and
means for scaling the sequence with the at least one scaling parameter to generate the DMRS.

27. The first sidelink device of claim 26, wherein the at least one scaling parameter comprises a frequency-domain cover code.

28. The first sidelink device of claim 27, wherein the frequency-domain cover code is an orthogonal cover code.

29. The first sidelink device of claim 23, further comprising:
means for determining a physical layer sidelink synchronization identifier for the first sidelink device based on the first sidelink identifier and the second sidelink identifier.

30. An article of manufacture for use by a first sidelink device in a wireless communication network, the article of manufacture comprising:
a computer-readable medium having stored therein instructions executable by one or more processors of the first sidelink device to:
transmit a sidelink secondary synchronization sequence based on a first sidelink identifier for the first sidelink device;
transmit a sidelink primary synchronization sequence based on a second sidelink identifier for the first sidelink device;
determine an initialization parameter based on the first sidelink identifier for the first sidelink device;
determine at least one scaling parameter based on the second sidelink identifier for the first sidelink device;
generate a demodulation reference signal (DMRS) based on the initialization parameter and the at least one scaling parameter; and
transmit the DMRS to a second sidelink device.

\* \* \* \* \*